(12) United States Patent
Sasaki et al.

(10) Patent No.: US 6,751,508 B2
(45) Date of Patent: Jun. 15, 2004

(54) CONTROL INFORMATION OUTPUT APPARATUS AND INFORMATION SYSTEM

(75) Inventors: Mikio Sasaki, Kariya (JP); Fumihiko Murase, Nagoya (JP)

(73) Assignee: Denso Corporation, Kariya (JP)

( * ) Notice: Subject to any disclaimer, the term of this patent is extended or adjusted under 35 U.S.C. 154(b) by 534 days.

(21) Appl. No.: 09/897,138

(22) Filed: Jul. 3, 2001

(65) Prior Publication Data

US 2002/0083065 A1 Jun. 27, 2002

(30) Foreign Application Priority Data

Jul. 7, 2000 (JP) .................................. 2000-206608
Jan. 9, 2001 (JP) .................................. 2001-001365

(51) Int. Cl.⁷ ............................................. G05B 15/00
(52) U.S. Cl. ............................ 700/1; 700/13; 700/14; 700/25; 706/55; 712/216; 718/106
(58) Field of Search ............................ 700/1, 13, 90, 700/14, 25; 712/216; 706/55; 718/106

(56) References Cited

U.S. PATENT DOCUMENTS

| 5,546,578 | A |   | 8/1996  | Takada            |         |
|-----------|---|---|---------|-------------------|---------|
| 5,555,411 | A | * | 9/1996  | England et al.    | 717/162 |
| 5,577,247 | A |   | 11/1996 | Uyama et al.      |         |
| 5,696,964 | A |   | 12/1997 | Cox et al.        |         |
| 5,721,865 | A | * | 2/1998  | Shintani et al.   | 711/137 |
| 5,787,474 | A | * | 7/1998  | Pflum             | 711/138 |
| 5,794,042 | A | * | 8/1998  | Terada et al.     | 717/101 |
| 6,108,769 | A | * | 8/2000  | Chinnakonda et al.| 712/216 |
| 6,209,084 | B1| * | 3/2001  | Chinnakonda et al.| 712/233 |

FOREIGN PATENT DOCUMENTS

| EP | 0982675 A2     |   | 1/2000  |            |
|----|----------------|---|---------|------------|
| JP | 402091766 A    | * | 3/1990  | G06F/15/347|
| JP | A-5-46398      |   | 2/1993  |            |
| JP | A-6-149892     |   | 5/1994  |            |
| JP | A-8-77105      |   | 3/1996  |            |
| JP | A-8-292864     |   | 11/1996 |            |
| JP | A-10-187565    |   | 7/1998  |            |
| JP | A-11-25122     |   | 1/1999  |            |

* cited by examiner

Primary Examiner—Ramesh Patel
(74) Attorney, Agent, or Firm—Posz & Bethards, PLC

(57) ABSTRACT

A control information output apparatus has a memory unit, an extraction unit and an output unit. The memory unit stores a dependence relationship between each application and a predetermined dependency factor. The memory unit also stores dependency table indicating dependence on the dependence factor of each application. Using the dependency factor value determined with data extracted by the extracting unit, an application list indicating the application having a higher execution request, dependency factor list indicating effective dependency factor and control information comprising a dependence vector and dependence characteristic are outputted from the output unit based on the dependency table and dependence characteristic information of the memory unit.

46 Claims, 28 Drawing Sheets

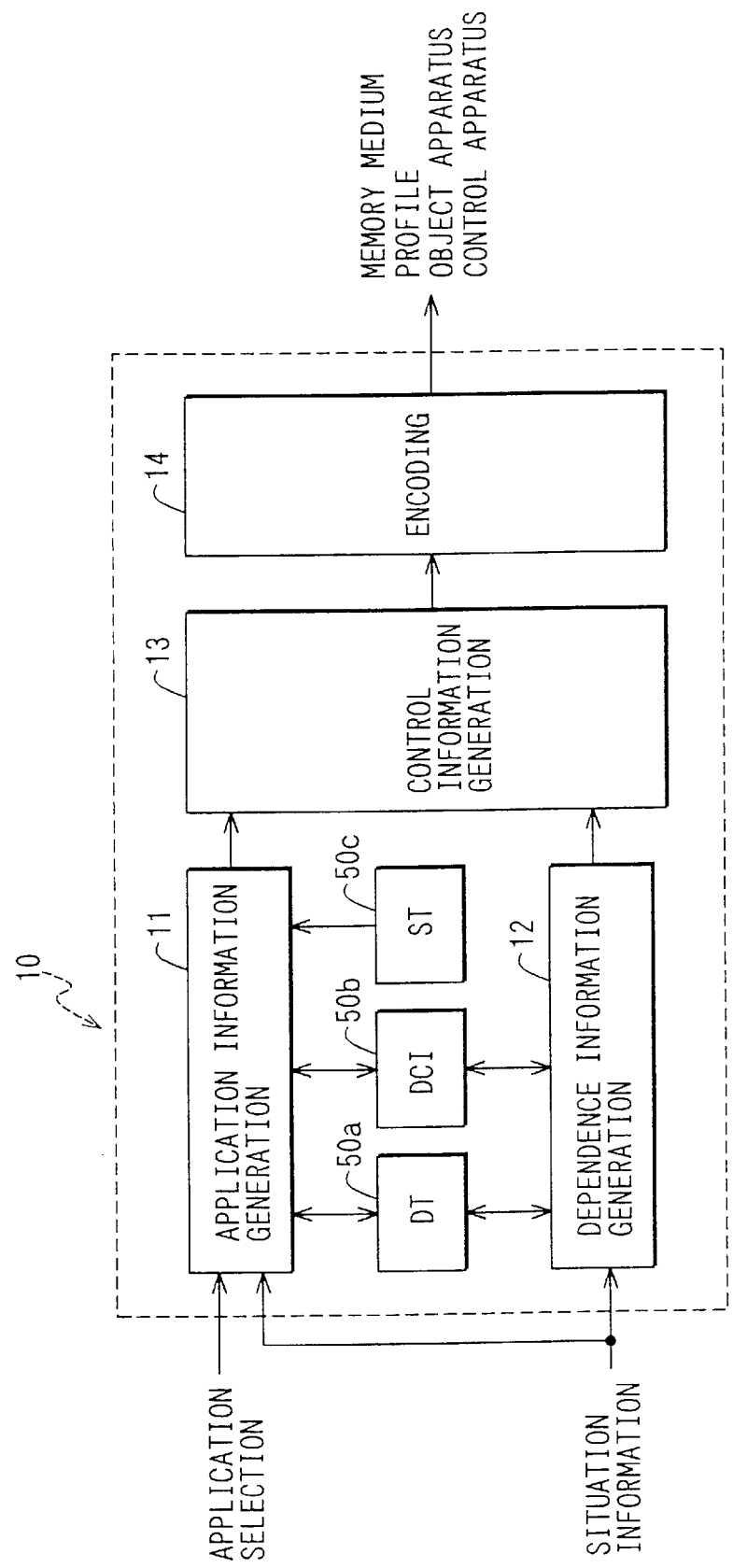

FIG. 3

| DEPENDENCY FACTOR | USER FACTOR | | | | | | | | | MEDIA FACTOR | | | | |
|---|---|---|---|---|---|---|---|---|---|---|---|---|---|---|
| | ENV·SIT | | | ENV | | REQ·CON | | | FAV | | | CONTENT | | |
| APPLICATION | TIME | PLACE | JOB | ENV | PERSON | NEEDS | FEEL | INT | FAV | TIME | PLACE | ACT | PROD | GENRE |
| OFFICE APPLICATION | | D | D | | | | | | | D | D | D | D | D |
| MEDICAL RECORD | D | D | D | D | D | D | | | | D | D | D | D | D |
| VIDEO EDITION | | D | D | D | | | | | | D | D | D | D | D |
| TV PHONE | D | D | D | D | D | | | | D | D | D | D | D | |
| HOME AV | D | D | | D | | | D | | D | D | D | D | D | D |
| ELECTRONIC CATALOG | | | D | D | D | D | | D | D | D | D | D | D | D |
| ROUTE GUIDANCE | D | D | D | D | | D | | | D | D | D | D | | D |
| FACILITY GUIDANCE | D | D | D | D | D | | D | D | D | D | D | D | D | D |
| WEATHER | D | D | | D | | D | | | D | D | D | D | | |
| TRAFFIC | D | D | | D | | D | | | D | D | D | D | | |
| KARAOKE | D | D | | D | D | | D | D | D | D | D | D | D | D |
| SPORT | | | | | D | | | D | D | D | D | | | D |
| GOLF | D | D | | | | | | D | D | D | D | D | | D |
| SKI | D | D | | D | | | | D | D | D | D | D | | D |
| RESTAURANT | D | D | | | D | D | | D | D | D | D | D | D | D |
| SHOPPING | D | D | | D | D | D | | D | D | D | D | D | | D |
| TRAVEL | D | D | | | D | D | | D | D | D | D | D | | D |
| SCENERY | D | D | | D | | | D | D | D | D | D | D | | D |
| NEWS | | D | D | | D | D | | D | | D | D | D | D | D |
| MUSIC | D | D | | D | D | D | | D | | D | D | D | D | D |
| EMERGENCY | D | D | D | | D | D | D | D | | D | D | D | D | D |

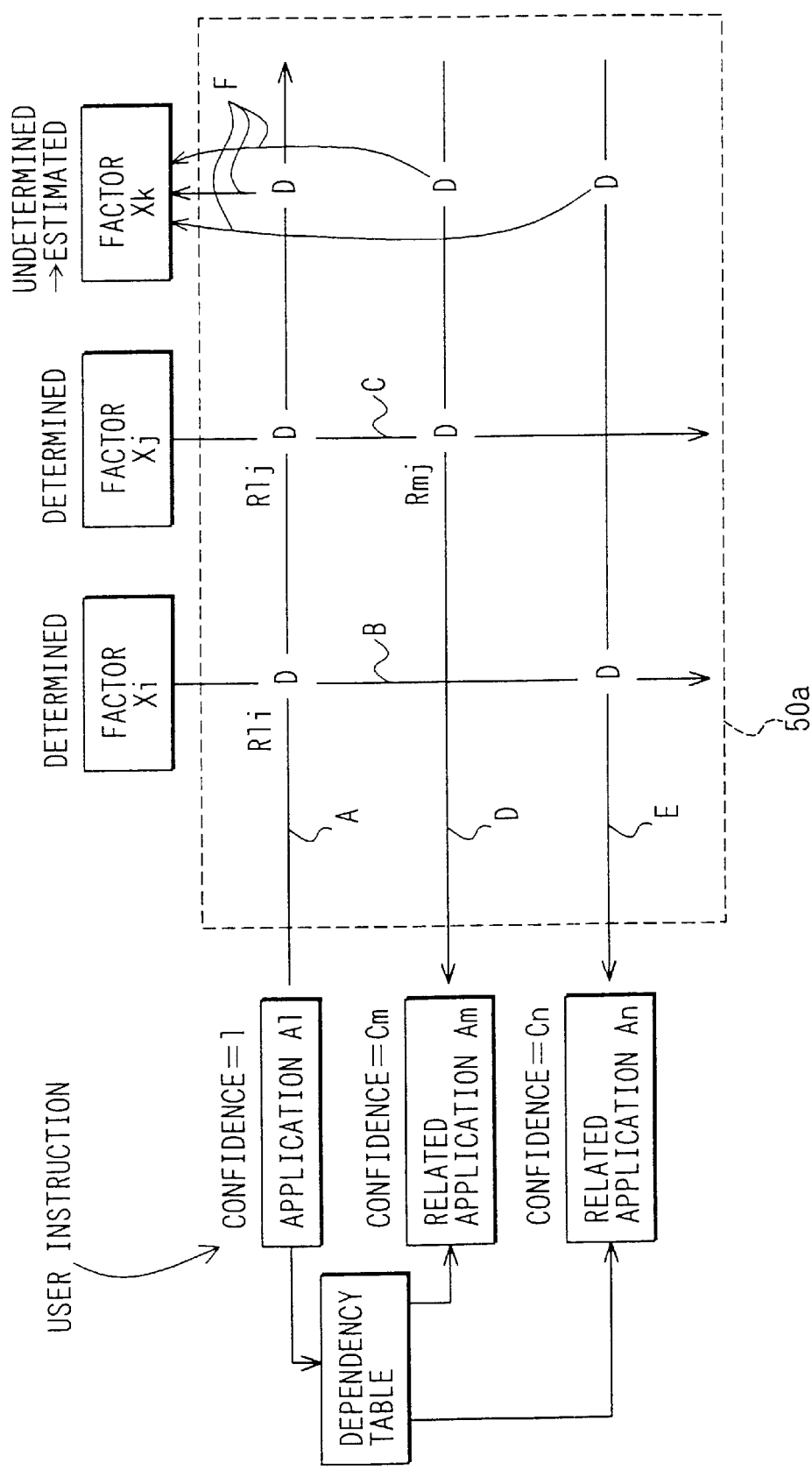

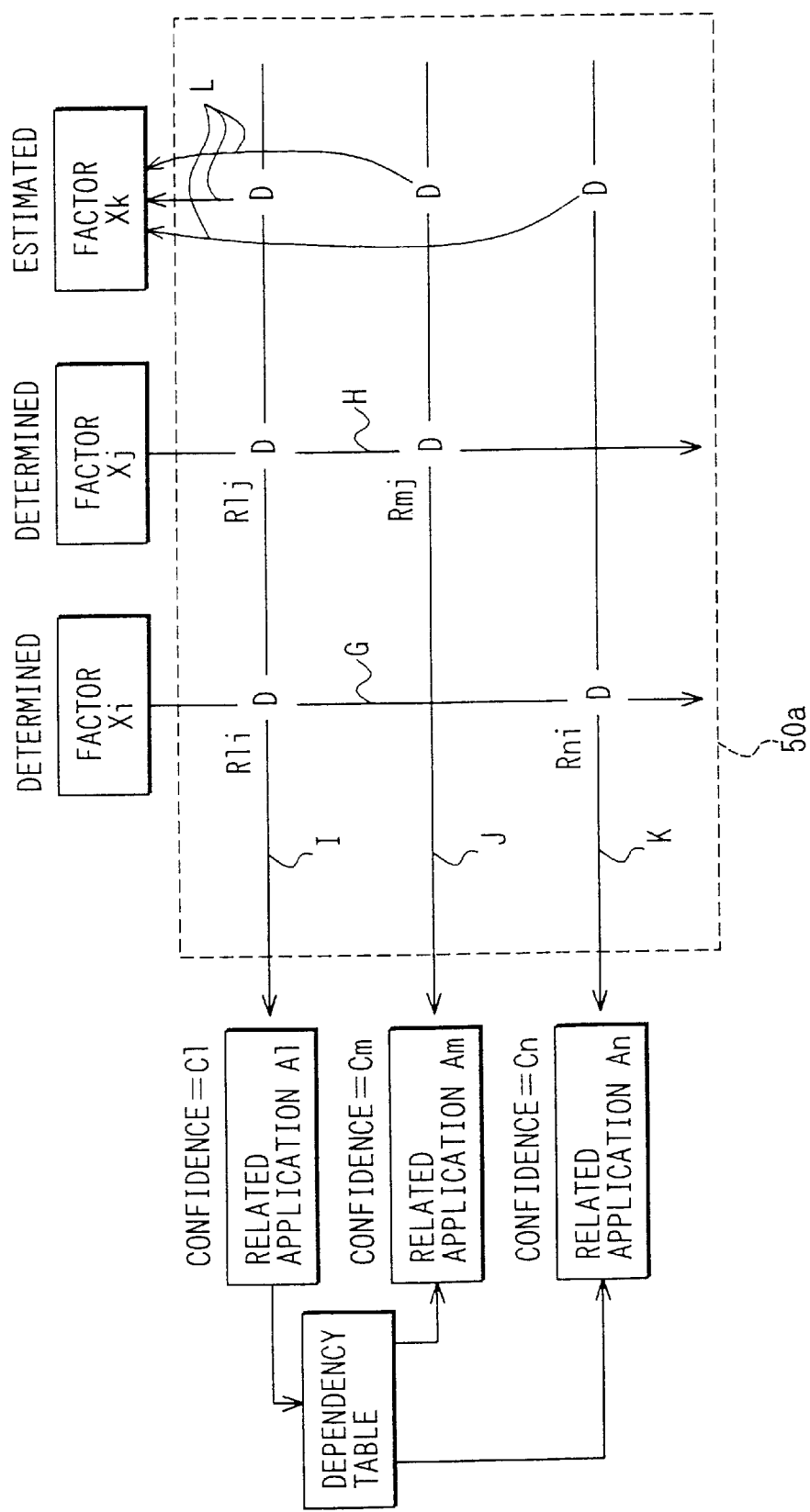

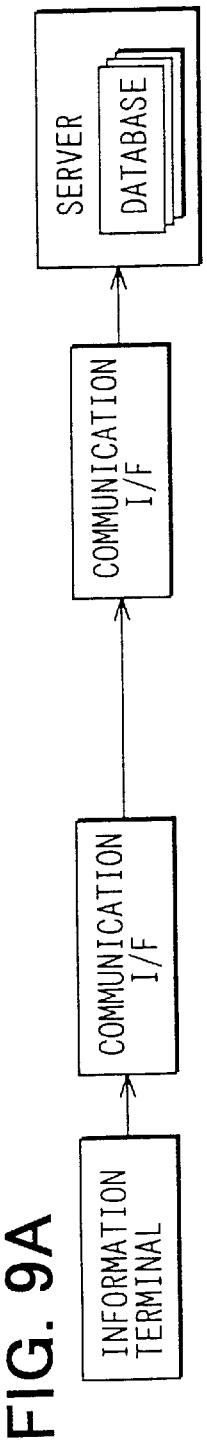
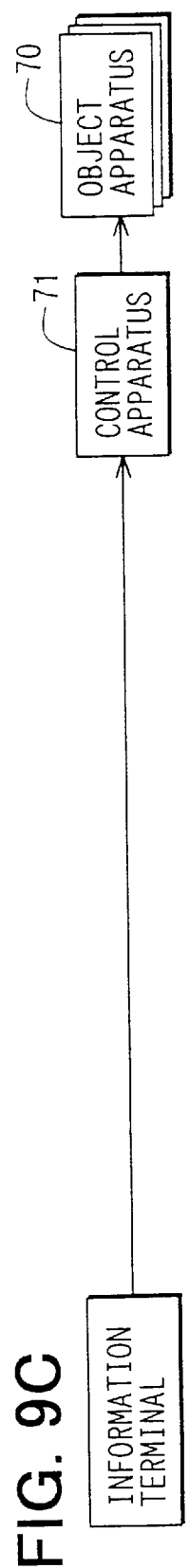
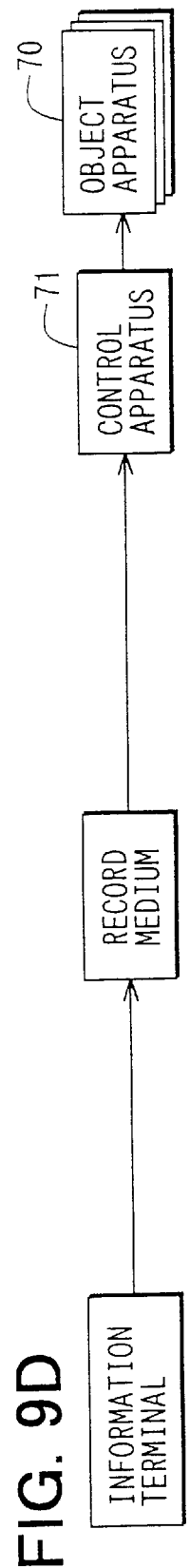
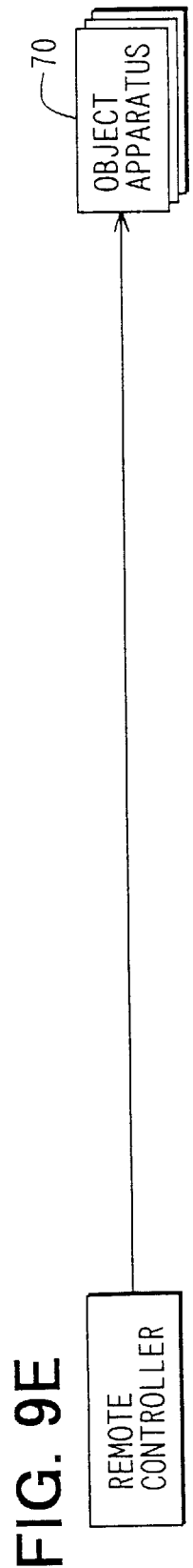

$N0_{TS} = 0/1$ (JAN. FEB. DEC.)
$N1_{TS} = 0/1$ (MAR. APR. MAY.)
$N2_{TS} = 0/1$ (JUN. JUL. AUG.)
$N3_{TS} = 0/1$ (SEP. OCT. NOV.)

TO EXPRESS DEPENDENCY ON SEASONS,
ONE-YEAR TIME (Ts) IS QUANTIZED INTO
FOUR PERIODS AND DEGREE OF REQUEST
IS EXPRESSED WITH 1/0.

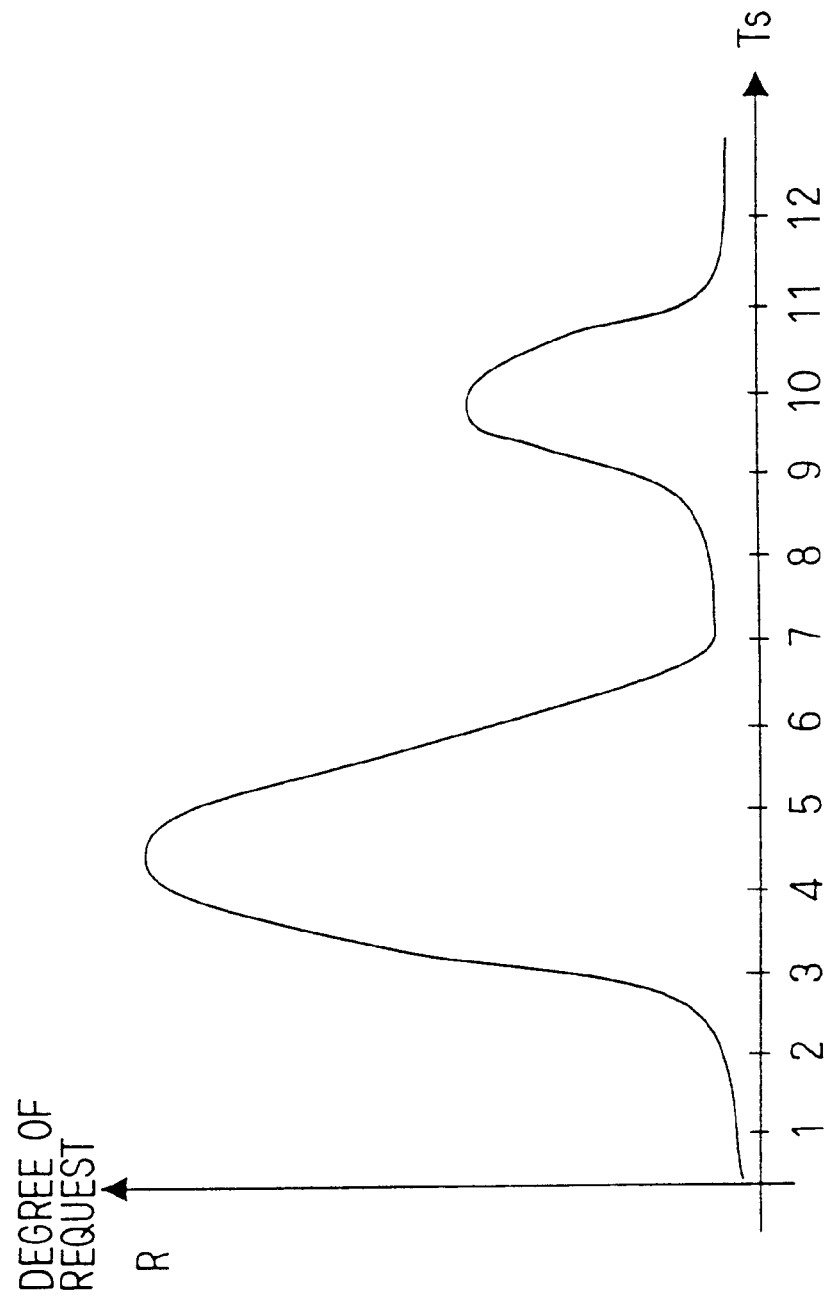

FIG. 23

| APPLICATION \ ATTRIBUTE | Tu USER TIME WHEN | Xu USER PLACE WHERE | Wu USER WEATHER WHICH WEATHER | Ts SCENE TIME WHEN | Xs SCENE PLACE WHERE | As SCENE ACTOR WHICH ACTOR | Fs SCENE FEELING WHAT FEELING |
|---|---|---|---|---|---|---|---|
| SCENE-1 SIGHTSEEING HOTEL | X SUMMER | X OKINAWA | X TYPHOON | FALL-LIKE | NAGANO | O UNKNOWN | X BRIGHT |
| SCENE-2 REPAIR MANUAL | O SUMMER | O OKINAWA | O TYPHOON | O NOV. 1999 | O NAGANO | O HANAKO? | O DARK |
| SCENE-3 SIGHTSEEING TRAFFIC | SPRING-LIKE | NAGOYA | FINE | SPRING-LIKE | SANAGE ROAD | UN-SPECIFIED | WARM |
| SCENE-5 IDOL VIDEO COMMERCIAL | X SPRING-LIKE | X GINZA | X FINE | SUMMER-LIKE | OKINAWA | MANAMI? | X COMFORT-ABLE |

CONTROL INFORMATION OUTPUT APPARATUS AND INFORMATION SYSTEM

CROSS REFERENCE TO RELATED APPLICATION

This application is based on and incorporates herein by reference Japanese Patent Applications No. 2000-206608 filed Jul. 7, 2000 and No. 2001-1365 filed Jan. 9, 2001.

BACKGROUND OF THE INVENTION

The present invention relates to a control information output apparatus and information system for outputting control information to operate each apparatus corresponding to individual situations.

In recent years, with rapid progress of computer systems, various apparatuses and devices are controlled with computers. For example, almost all home electric appliances such as television receiver, video tape recorder, electric refrigerator, electric rice cooker, air-conditioner, audio device and game machine are provided with a computer system such as microcomputer. These home appliances are operated with a program executed in the computer system. Moreover, it is now possible to realize a route guidance with a navigation system and facility retrieval with the Internet system in a vehicle compartment.

With such a computer control, automated process is promoted in respective aspects of daily life and thereby effective use of time can be promoted for users. For example, if a person desires to have breakfast at 7 a.m., the power supply of electric rice cooker is turned on to start the operation thereof to complete the cooking of rice only when a person sets the completion time of rice cooking of the rice cooker to 7 a.m.

However, in the current situation, effective use of a user cannot be promoted in some cases even with such progress of computer technology. It is because the operation itself is certainly simplified but a user himself is required to issue the request and execute the settings depending on individual conditions. In regard to the rice cooking, a user has been requested to make the setting to complete the rice cooking at 7 a.m. That is, even when the computer system is mounted, the electric rice cooker itself does not automatically make the setting for the time to complete the rice cooking without any intervention of a user.

On the other hand, such a user request to operate the electric rice cooker to complete the rice cooking at 7 a.m. can be determined based on various factors. When such a user request can be determined with the reasonable probability, the home electric appliances as listed above as well as the electric rice cooker can be totally used with the half-automatic set-up.

For example, U.S. Pat. No. 5,577,247 (JP No. 2695542) discloses an apparatus to perform management of user information to execute information process along the property of user. This patent relates to a patterning method for matching of message pattern. Moreover, JP-A-7-261994 discloses a method to customize the software in correspondence between phenomenon and action. This patent relates to classification of the phenomena and actions. This is also a patterning method.

However, in the examples explained above, the apparatus as the operation object of user is diversified and user request for such apparatus are generated with various factors. Therefore, it is difficult to adapt the technology of such patents into various apparatuses because the patterning of user action is limited.

SUMMARY OF THE INVENTION

The present invention has an object to provide a structure to totally operate the object apparatus with half-automatic set-up by integrally detecting the operation object apparatus and various factors to generate a user request for such an object apparatus.

According to the present invention, a control information output apparatus stores a dependence information therein. This dependence information indicates whether the application programs to be executed in the object apparatus respectively depend on the predetermined dependence factors or not. This apparatus outputs the control information based on this dependence information.

Here, "application program executed in the object apparatus" means the application program to be installed in various apparatuses and the application program to be installed in the personal computers. That is, the object apparatus is considered in unit of the programs installed in such apparatus. When the object apparatus corresponds to a personal computer, the apparatus may have the structure to be provided within the computer.

Such a profile of considering the object apparatus in unit of the programs installed therein will be explained with an example, where the electric rice cooker and videotape recorder are defined as the object apparatus. In this case, it is assumed that the two application programs A, B are installed in the electric rice cooker and the three application programs C to E are installed in the videotape recorder. Five application programs A to E are executed in the object apparatus. Expression of application program is used here because it is discriminated from the programs such as the operating system to realize the basic operation of the computer system. Moreover, the "application program" used here covers the large scale programs and small scale programs to be executed with the microcomputer built in the home electric appliances to execute the ON/OFF operation of hardware such as a switch or the like.

Moreover, the present invention can also be realized as an information system comprising a control information output apparatus for outputting control information based on the dependence information and a server apparatus for searching the applications based on the control information outputted.

For example, when it is tried to execute the application search such as the video data, for example, it is considered to use the meta-data as the content description data, but in some cases, the data size of such meta-data exceeds 1 K-byte. Therefore, when the search object exceeds the order of several millions, the meta-data communication of the G-byte order is required. Moreover, when users themselves exceed several millions of people, the real-time process becomes impossible in some cases even with the computer having the highest level performance from the viewpoint of the communication infra-structure and communication traffics of database site.

On the other hand, when the application (content) search is performed based on the dependence information, the applications and users may be totally and simply expressed with the concept of the dependence. Moreover, since the amount of data is controlled, high speed search is now possible and thereby highly efficient search can be realized even when extraordinary amount of contents exists in distribution over a plurality of databases.

Moreover, it can also be thought that the user side applications are expressed with the user side dependence information while the server side applications are expressed with the server side dependence information. In this case, the server apparatus operates through inter-relation of the user side and server side applications.

Applications are changing with times and also changes depending on countries and cultures. Meanwhile, the database having mutual operation property can also be used continuously. Therefore, it is difficult for the contents other than that generated on the assumption of the particular services to sort the contents with the application name. However, when idols in the entertainment word, traffic congestion information, news and sightseeing information are considered, the applications for processing such information and viewpoint of user for the contents may be changed but the basic evaluation attribute can be thought to exist as the constant or permanent property.

BRIEF DESCRIPTION OF THE DRAWINGS

Other objects, features and advantages of the present invention will become more apparent from the following detailed description made with reference to the accompanying drawings. In the drawings:

FIG. 2 is a function block diagram of a control unit in the control information output apparatus;

FIG. 3 is an explanatory diagram illustrating a dependency table;

FIG. 6 is an explanatory diagram indicating a search process based on the dependency table;

FIG. 7 is an explanatory diagram indicating the search process based on the dependency table;

FIGS. 9A to 9E are explanatory diagrams indicating examples of system configuration using the control information output apparatus;

FIG. 22 is an explanatory diagram illustrating relationship between a scene time and a degree of request to a scene;

FIG. 23 is an explanatory diagram illustrating relationship between the application of scene and attribute;

DETAILED DESCRIPTION OF THE PREFERRED EMBODIMENTS

The preferred embodiments of the present invention will be explained with reference to various embodiments.
[First Embodiment]

Figure 1:
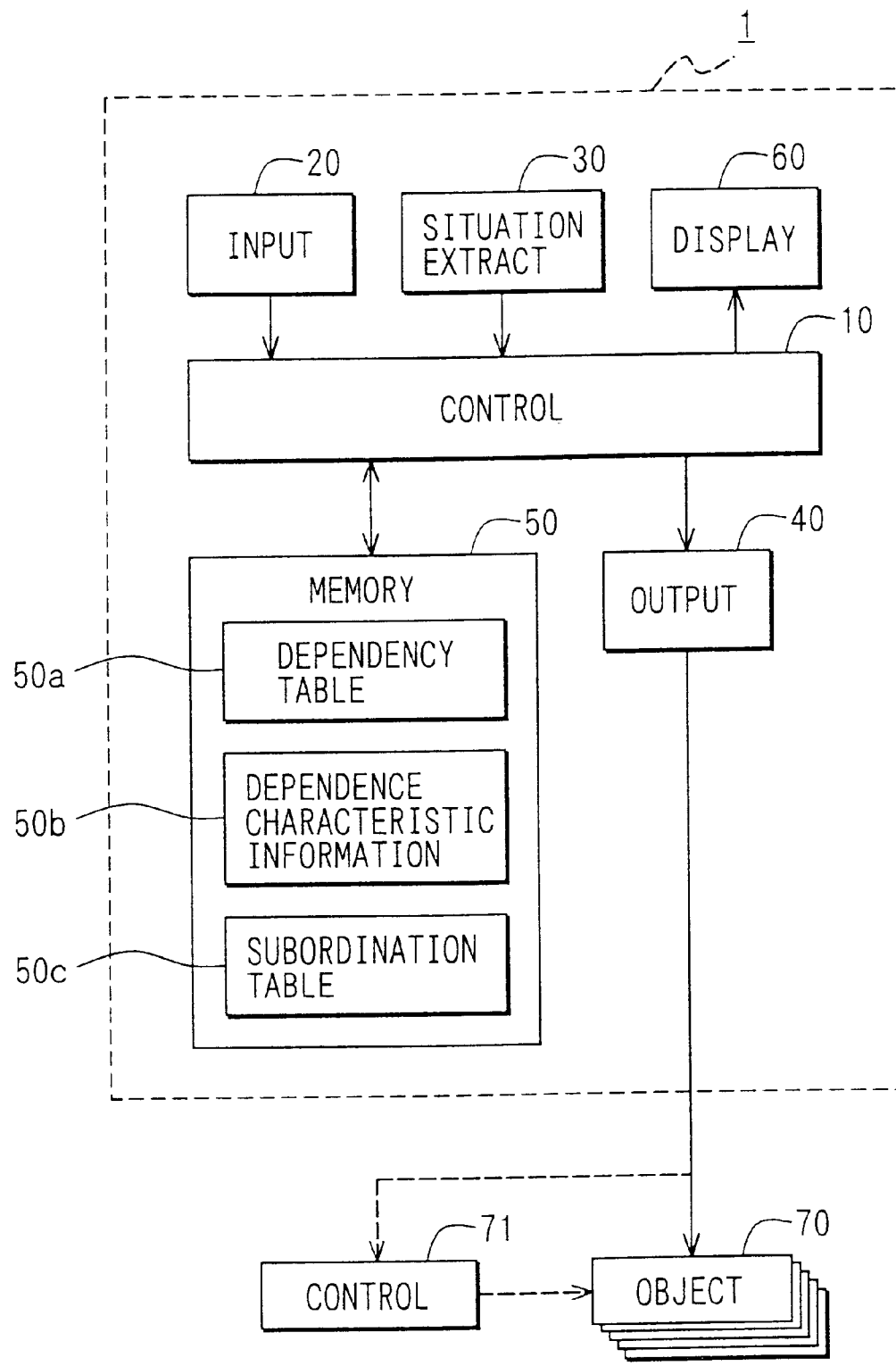
FIG. 1 is a block diagram illustrating a structure of the control information output apparatus according to a first embodiment of the present invention.

FIG. 1 is a block diagram illustrating a structure of a control information output apparatus 1 of a first embodiment.

The control information output apparatus 1 is comprised of a control unit 10, an input unit 2 connected to this control unit 10, a situation extracting unit 30, an output unit 40, a memory unit 50 and a display unit 60. The control unit 10 is a computer system comprising a CPU, ROM, RAM and I/O or the like.

The input unit 20 is structured to input instruction information from a user and is comprised of a pointing device such as a keyboard, a mouse or the like.

The situation extracting unit 30 is structured to extract the situation which is changing from time to time as the data. In practice, it is considered to form such a situation extracting unit 30 with a communication device for extracting various situation information pieces transmitted from an external device, or a plurality of sensing devices to extract various situation information pieces or a device formed of using a plurality of devices explained above.

The output unit 40 has a structure to output the control information generated by the control unit 10 to the external circuits. The control information outputted from the output unit 40 is used for operation and setting of an object apparatus 70. Therefore, it is considered to form such output unit 40 as a communication device to transmit the data to the object apparatus 70. Moreover, it may be formed as a communication device to transmit the data to a control apparatus 71 to control a plurality of object apparatuses 70. In addition, when it is enough that the control information can be used finally for operation and setting of the object apparatus 70, it is possible to form the structure to provide the file output as the profile of the predetermined format and the structure to write the information to the recording medium.

The memory unit 50 is structured to store the information and may be a hard disk apparatus. Moreover, it may also be realized as a semiconductor memory device. This memory unit 50 stores a dependency table 50a as the "dependence information", dependence characteristic information 50b as the "dependence characteristic" and a subordination table 50c as the "subordinate relationship".

The display unit 60 is a display device utilizing the liquid crystal and realizes display of information for a user.

Under this structure, the control unit 10 refers to the dependency table 50a, dependence characteristic information 50b and subordination table 50c stored in the memory unit 50 on the basis of the information inputted from the input unit 20 and situation extracting unit 30. It generates the control information used for operation and setup of the object apparatus 70 and then outputs such control information via the output unit 40.

FIG. 2 is the function block diagram of the control unit 10.

The control information generated in the control unit 10 is comprised of the application information and dependence information. The application information is an application list indicating the application program having a higher execution request. On the other hand, the dependence information is comprised of a dependence vector, dependence characteristic and dependence factor list.

The application information which is embodied as an application list is generated in an application information generating block 11 at least based on the situation information, dependency table (DT) 50a, dependence characteristic information (DCI) 50b and subordination table (ST) 50c. The reason why the phrase "at least" is used is that a user can selectively instruct the application program to be executed by the object apparatus 70 via the input unit 20. When selection of application program is instructed, the application information is generated considering the instruction for selecting this application. On the other hand, the dependence information is generated in the dependence information generating block 12 based on the situation information, dependency table 50a and dependence characteristic information 50b.

The application information and dependence information generated respectively in the application information generating block 11 and a dependence information generating block 12 are outputted to a control information generating block 13, and then summarized as the control information. Thereafter, this control information is outputted to an encoding block 14. In the encoding block 14, the control information is encoded. The encoded control information is outputted to the control apparatus 71 for controlling the memory medium, profile, object apparatus 70 or a plurality of object apparatuses 70.

The control information output apparatus 1 of the first embodiment is characterized in generation of such control information. Therefore, generation of such control information will then be explained in detail.

First, the dependency table 50a, dependence characteristic information 50b and subordination table 50c which are referred for generation of the control information will be explained. Subsequently application list, dependency factor list and dependence vector as the control information will be explained. Thereafter, the control information generating operation will be explained.

(1) Dependency Table

The dependency table 50a indicates the dependence relationship between the user request for various application programs to be executed by the object apparatus 70 and the factor (hereinafter, referred to as "dependency factor"). An example of the dependency table 50 is illustrated in FIG. 3. The two-dimensional dependency table 50a illustrated in FIG. 3 relates to the application program in relation to video media.

(1-1) Description of the Application Program

The application programs to be executed with the object apparatus 70 are given in the left most column in FIG. 3. The "Applied Office" application is used for generation of documents and spread sheet calculation. The "Medical Record" application is used for medical recording such as walking conditions using the video contents. The "Video Edition" application is used to cut the intermediate part of video content and replace the sequence of video content. Moreover, the "TV telephone" application is installed to a TV-phone in order to exchange the conversation voices and conversation images. The "Home AV" application is installed to the home electric appliances for processing video-aided information such as a video tape recorder. The "Electronic Catalog" application enables the catalog shopping through guidance and sales of products using video content.

The application programs after the hatched area in FIG. 3 are application programs particularly installed in the navigation apparatus and mobile information terminals among those in relation to video media.

The "Route Guidance" application executes the route guidance by setting the guiding route up to the destination when the destination is set. Moreover, "Facility Guidance" application is used to search facilities. Moreover, the "Weather Information", "Traffic Information", "Karaoke", "Sport Information", "Golf Information", "Ski Information", "Restaurant Information", "Shopping Information", "Travel Information", "Scenery Information", "News Information", "Music Information" and "Emergency Information" applications are used to present respective information pieces obtained using video content.

(1-2) Description of Dependency Factor

The dependency factor described in the dependency table 50a can roughly be sorted to the following three factors of the user factor, system factor and media factor.

(1-2-1) User Factor

The user factor is the factor in relation to users including environment and situation of users and request and condition of users. For example, environment and situation cover the ambient conditions such as time, place, job content and existence of noise, or the like. Moreover, request and condition, for example, cover needs in the life and taste covers the desire for eating and resting, or the like. As the other factors in relation to users, favorite things of users may be thought.

These user factors include the item of "Environment/Situation/Request/Condition of user" in the profile system presented by the applicant of the present invention disclosed in the Official Gazettes of JP-A-12-20090 and JP-A-11-351901. The item disclosed in these Official Gazettes indicates, particularly, the factor within a vehicle. However, the user factor in the present specification is not limited to the factor within a vehicle.

(1-2-2) System Factor

The system factor comprehends, for example, following factors in relation to the system controlled with the control information, that is, memory capacity, number of application programs to be executed in parallel, processing capability, operation environment, moreover, communicating condition and communication cost under the precondition of executing the communication, and display device condition such as display area size under the precondition of providing a display device such as display unit.

(1-2-3) Media Factor

The media factor relates to the media as the processing object of the application programs. This media factor includes type of media such as DVD, CD-ROM or the like and information, for example, genre, producer, date and time and place or the like in relation to the content stored in the media.

The dependency table 50a of FIG. 3 indicates various items belonging to the user factor and media factor.

The environment/situation factor of user includes the items of "Time", "Place", "Job", "Ambient Condition" and "Ambient persons". The "Ambient Environment" means the condition whether ambient is noisy or not, or crowded or not. Moreover, the "Ambient Peoples" means discrimination that peoples are children or adults, or family members or friends.

The user request/condition factor includes the items of "Needs in life", "Feeling" and "Interest". The "Needs in life" is very similar to the user request such as desires for "eating" and "resting" or the like. Meanwhile, the "Feeling" and "Interest" is similar to the user condition. For example, user condition such as "being tired" and "Excellent feeling" are considered as the item "Feeling" and the item "Interest" is considered as the information such as user taste. Moreover, the item "Favorite Thing" includes favorite programs and actors and actresses.

As the media factor, the items in relation to contents are indicated in FIG. 3. That is, the media factor includes "Time", "Place", "Acting Person", "Producer" and "Genre". The item "Time" means a reproducing time of content. The item "Place" means the photographing place. The item "Acting Person" means actors or actress or patient in the medical recording.

Such a dependency factor is determined on the basis of the data acquired by the situation extracting unit 30 illustrated in FIG. 1. A value which the dependency factor can take is defined as "Dependency Factor Value".

For example, the user factor "Time" is thought to be acquired based on the signal output from a clock. For example, such time can be extracted as the time up to 0 o'clock from 12 o'clock. Moreover, the user factor "Place" is thought to take a dependency factor value such as restaurant, part, sport facilities, company, own house, in-vehicle or the like. Such dependency factor value can be determined by the matching between the position information obtained, for example, by the GPS receiver and map data. Moreover, it is also possible to determine the intrinsic information of a user by conducting management such information, for example, in the system of profile and then making reference to such profile. This profile may have a structure to be stored within the control information output apparatus 1. In addition, it is of course possible that such profile is stored in the external apparatus and then it is extracted from such apparatus via the situation extracting unit 30.

Moreover, for example, the media factor in FIG. 3 may be thought to be recorded as the header information to the media as the processing object of the application program. In the music CD, the reproducing time of each music has been recorded. Therefore, it can also be thought that the "Time", "Place", "Acting Person", "Producer" and "Genre" are recorded in the predetermined format in the video media. Such information pieces are extracted from the side of object apparatus 70 via the situation extracting unit 30. Such a media factor may be used by previously recording in the format of profile and then reading out from this profile.

(1-3) Description of Dependency

On which dependency factor each application program depends is described in the dependency table 50a. In FIG. 3, description "D" means "dependence". For example, it is understood from FIG. 3 that the "Applied Office" application depends on the "Place", "Job" of user factor and "Time", "Place", "Acting Person", "Producer" and "Genre" of media factor.

(2) Dependence Characteristic

The information indicating on which dependency factor each application program included in the dependency table 50a depends is determined based on the dependence characteristic information 50b.

The dependence characteristic information 50b indicates the correspondence relationship between the dependency factor value which the dependency factor can take and statistic degree of request of user to the application program (hereinafter referred to as "degree of request"). When the user factor is "Time", the dependency factor value is defined, as explained above, as the continuous value such as the time up to 12 o'clock from 0 o'clock. On the other hand, when the user factor is "Place", the dependency factor value is defined as the discrete value such as Restaurant, part, sport facilities, company, own house and in-vehicle.

Figure 4:
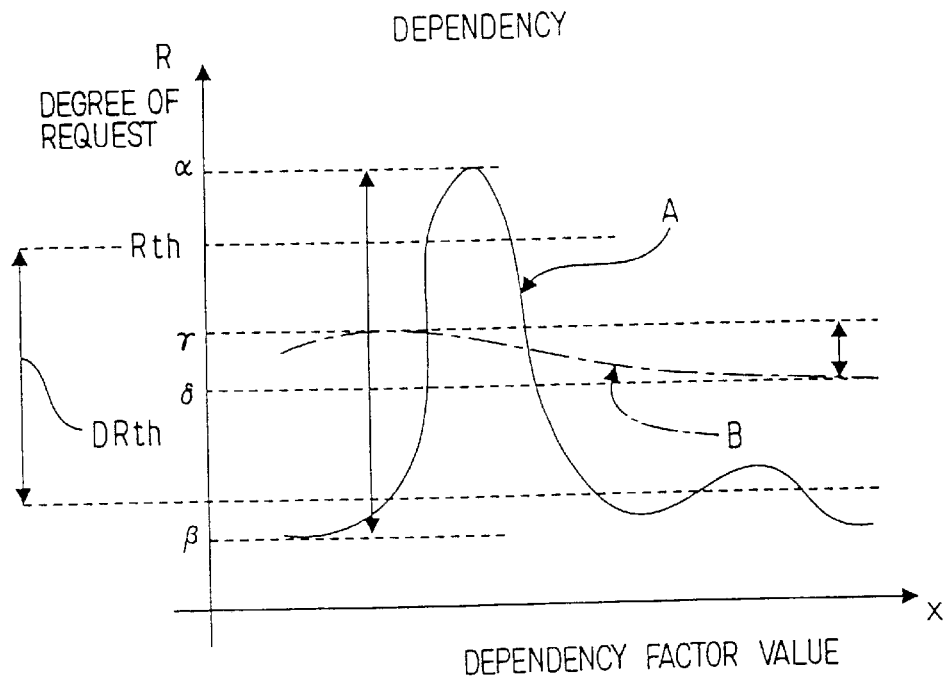
FIG. 4 is an explanatory diagram illustrating a dependence characteristic.

For example, the correspondence relationship between the continuous dependency factor value and degree of request is illustrated in FIG. 4. Here, the dependency factor value X is plotted on the lateral axis, while the degree of request R to the application program is plotted on the vertical axis. In the case where the degree of request R changes relatively to a large extent, it is defined here that the application program depends on its dependency factor.

In practice, in this first embodiment, it is defined, when the conditions ① to ③ indicated below are satisfied, that the degree of request R changes relatively to a large extent.
① The maximum variation width of degree of request R for the dependency factor value X exceeds a first threshold value DRth.
② The maximum value Rmax of the degree of request exceeds a second threshold value Rth.
③ A curve of the dependence characteristic is constant for the time or regularity can be found.

FIG. 4 indicates, for example, two kinds of the dependence characteristics, including the dependence characteristic of curve A indicated with a solid line (hereinafter referred to as the "dependence characteristic A") and the dependence characteristic of curve B indicated with a chain line (hereinafter referred to as the "dependence characteristic B").

The dependence characteristic A has the maximum variation width of degree of request R for the dependency factor value X defined as $\alpha-\beta$ and the maximum value Rmax of degree of request R defined as $\alpha$. Therefore, as will be understood from FIG. 4, $\alpha-\beta>DRth$ and $\alpha>Rth$. Therefore, when the dependence characteristic A is constant or has regularity to the time, the application program having the dependence characteristic A is assumed to depend on its dependency factor.

On the other hand, the dependence characteristic B has the maximum variable width of degree of request to the dependency factor value X defined as $\gamma-\delta$ and the maximum value Rmax of degree of request defined as $\gamma$. Therefore, as will be understood from FIG. 4, $\gamma-\delta<DRth$, $\gamma<Rth$. Therefore, the application program having the dependence characteristic B is assumed to not depend on the dependency factor.

The condition ③ is set based on the reason that the application program, if it allows variation to a large extent of the degree of request R for the time X within a day, cannot be determined to have dependence on the time X when the degree of request R changes every day. Moreover, when the dependency factor value has a discrete value, it is thought, for example, that the dependency factor value and the degree of request correspond with each other in the table format. In this case, dependence or not can be defined with the method similar to that explained above.

Such dependence characteristic information 50b assures correspondence between the dependency factor indicated in FIG. 3 and the application programs and also corresponds to each column in the dependency table 50a.

When such dependence characteristic information 50b is determined, the dependency table 50a can be determined from the dependence characteristic information 50b using the definition of dependency explained above. Therefore, it can be thought that such dependence characteristic information 50b is stored with previous statistic process of the user request. However, since the application program selection instruction can be inputted from a user via the input unit 20, the leaning may be changed based on the application program selection instruction. Moreover, with change of leaning of the dependence characteristic information 50b, it is preferable to form a structure that change of learning is made also in the dependency table 50a using the definition of dependency.

(3) Subordination Table

The subordination table 50c indicates the subordination relationship among application programs. A user request to a certain application program sometimes grows in relation to the other application program. For example, the possibility for use of spreadsheet application is used simultaneously with, for example, the document generation application. Therefore, the subordination relationship that the spreadsheet application is subordinate to the document generation application is stored in the subordination table 50c.

Moreover, subsequently, the application list, dependency factor list and dependence vector as the control information will then be explained.

(4) Application List

The application list is a list of application programs hierarchically structured depending on the degree of execution request. In this first embodiment, the hierarchical application list in the four levels of ① to ④ is generated.

① Perfect Application List ("F-ALST")

This list is prepared for all application programs registered and is used for collation of the application programs in the sides of control information output apparatus 1 and object apparatus 70.

② User Application List ("U-ALST")

This list is prepared for the application programs which may be requested by user and is used as the sub-set of the F-ALT.

③ Request Application List ("R-ALST")

This list is prepared for the application programs which may be estimated to be requested by user and is used as the sub-set of U-ALST.

④ Execution Application List ("E-ALST")

This list is prepared for the application programs which have been determined to be executed and is used as the sub-set of R-ALST.

(5) Dependency Factor List

The dependency factor list is a list of the dependency factors hierarchically structured depending on the degree of efficiency thereof. In this first embodiment, the dependency factor list which is hierarchically structured in the following four levels of ① to ④.

① Perfect Dependency Factor List ("F-DLST")

This list is prepared for all dependency factors registered and is used for collation of the dependency factors between the control information output apparatus 1 and the object apparatus 70.

② User Dependency Factor List ("U-DLST")

This list is prepared for the dependency factors which are required for determining the request from a user and is also prepared for the dependency factors for which the dependency factor value may be determined and is used as the sub-set of F-DLST.

③ Active Dependency Factor List ("A-DLST")

This list is prepared for the dependency factors of which dependency factor value is determined and is used as the sub-set of U-DLST.

④ Most Important Dependency Factor List ("P-DLST")

This list indicates the dependency factor in relation to the application program of which execution is determined and is the most important list. This list is used as the sub-set of A-DLST.

(6) Dependence Vector

The dependence vector can be extracted from the dependency table 50a in unit of line and also corresponds to the "dependence information". The dependence vector indicates the dependency factor on which a certain application program depends. For example, in the dependency program 50a in FIG. 3, the dependence vector of the "Applied Office" application can be expressed as the dependence vector DP=(0, 1, 1, 0, 0, 0, 0, 0, 0, 1, 1, 1, 1, 1) by replacing the sign D indicating dependence with logical value "1" and a blank indicating independence (no-dependence) with a logical value "0". Therefore, it can be determined on which dependence factor a certain application program depends through collation between the dependence vector and F-DLST explained above.

Figure 5:
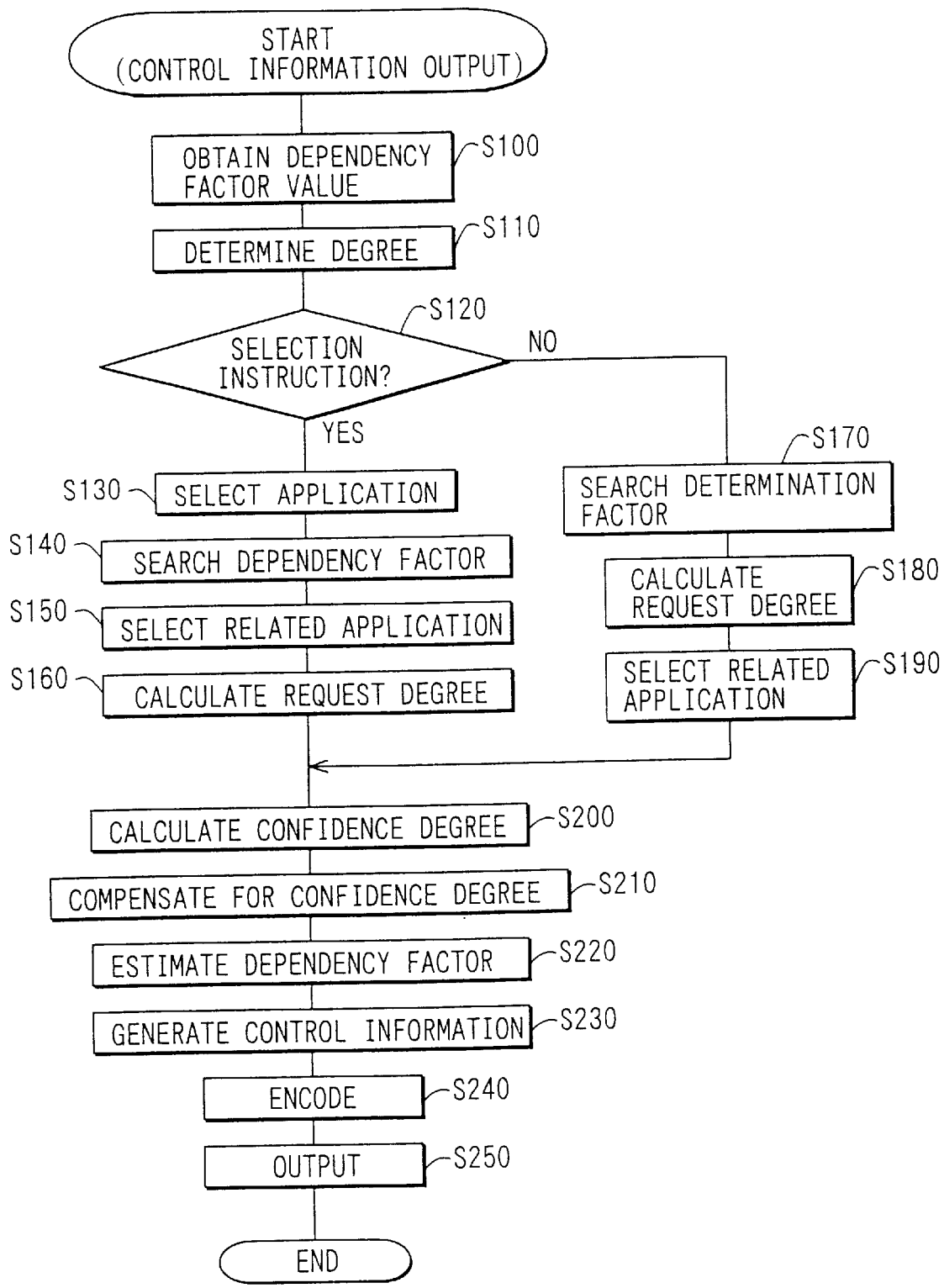
FIG. 5 is a flow diagram indicating a control information output process.

Next, control information generating operation will be explained. Here, the control information output process to be executed with the control unit 10 will be explained based on the flow diagram of FIG. 5. This control information output process is executed when the control information output instruction is issued via the input unit 20. Here, the explanation will be made by referring to FIG. 6 and FIG. 7 which schematically illustrate the dependency table 50a.

In the first step (hereinafter, the step is indicated only with sign S) 100, a dependency factor value is obtained. This step is the process to determine various dependency factor values explained above. In practice, the dependency factor values are obtained based on the data acquired with the situation extracting unit 30.

In the subsequent S110, an effective degree of the dependency factor is determined to determine the setting of the dependency factor value. The reason why such effective degree of the dependency factor is determined as explained above is that reliability of dependency factor value is possibly lowered due to the ambient condition and thereby dependency factor may become inadequate. For example, in such a case where the dependency factor value is not the value within the predetermined range, the dependency factor value is defined as not determined.

In the next S120, it is determined that the application program selection instruction is issued from a user or not. In the control information output apparatus 1 of this first embodiment, a menu of the application programs to be executable in the object apparatus 70 is displayed via the display unit 60. A user can issue the instruction to select the application program from this menu. Here, when it is determined that the instruction to select the application program is issued (S120: YES), the process advances to S130. Meanwhile, when it is determined that the instruction to select the application program is not issued (S120: NO), the process advances to S170.

In the S130 to which the process goes when the instruction to select the application program is issued, the application program is selected. This process selects the application program which is selected by a user by issuing the instruction and sets the execution confidence degree of this application program to "1". The execution confidence degree is the normalized information and when the nearer to "1" this value is, the higher the execution request from a user is.

For example, as illustrated in FIG. 6, when the application A1 is instructed from a user, the execution confidence degree of this application A1 is set to "1".

In the next S140, the dependency factor value is determined in the dependency factor on which the application program selected in the S130 depends. Moreover the dependency factor wherein the requesting degree calculated from the dependency factor value becomes larger than the predetermined value is searched on the basis of the dependency table 50a and dependence characteristic information 50b.

In FIG. 6, for example, the row of the application A1 in the dependency table 50a is sequentially searched (the searching direction is indicated with the arrow mark A) to search the dependency factors Xi, Xj of which dependency factor values are determined from the dependency factors Xi, Xj, Xk to which "D" indicating dependence is described. Moreover, the requesting degrees R1i, R1j for the dependency factors Xi, Xj are calculated based on the dependence characteristic information 50b to compare the respective predetermined values R1th, R2th. When the requesting degree R1i>R1th, the dependency factor Xi is selected as the effective factor. In the same manner, when the requesting degree R1j>R2th, the dependency factor Xj is selected as the effective factor. Here, following explanation will be made under the condition that the dependency factors Xi, Xj are selected as the effective factors.

In the subsequent S150, the related applications are selected. In this process, the application program depending on the dependency factor that is determined and determined to be effective is selected based on the dependency table 50a.

For example, in the case of FIG. 6, the related applications Am, An depending on the selected dependency factors Xi, Xj are selected. In more detail, the column of the dependency factor Xi is searched in the direction of arrow mark B and the application An in the row where "D" indicating dependence is described is selected as the application (refer to arrow mark E). In the same manner, the column of the dependency factor Xj is searched in the direction of the arrow mark C and the application Am in the row where "D" indicating dependence is described is selected as the related application (refer to the arrow mark D).

In the next S160, the requesting degree is calculated. This process is executed to calculate the requesting degree of the related application in regard to the dependency factor which is determined and is determined as effective.

For example, in FIG. 6, the requesting degree Rmj for the dependency factor Xj to the related application Am and the requesting degree Rni for the dependency factor Xi to the related application Am are calculated.

After completion of the process of S160, the process advances to the S200.

On the other hand, in the S170 to which the process goes when the instruction to select the application program is not issued, the determination factor is searched. This process is performed to make the marking in the dependency table 50a to the dependency factor of which dependency factor value is determined in the S110. The dependency factor searched in this step is then added to A-DLS in the dependency factor list.

In FIG. 7, for example, since two dependency factors Xi, Xj are determined, these are given the marking and then added to A-DLST.

In the subsequent S180, the requesting degree is calculated. This process is performed to calculate the determined dependency factor, that is, the requesting degree for the dependency factor added in A-DLST using the dependence characteristic information 50b.

In the case of FIG. 7, the requesting degrees R1i, R1j, Rmj, Rni to the application program for the dependency factors Xi, Xj are calculated. In more detail, the column of the dependency factor Xi is searched in the direction of arrow mark G and the requesting degrees R1i, Rni for the applications A1, An of the row to which "D" indicating dependence is described are calculated. In the same manner, the column of the dependency factor Xj is searched in the direction of arrow mark H and the requesting degrees R1j, Rmj for the applications A1, Am to which "D" indicating dependence is described are calculated.

In the next S190, the related applications are selected. This selection is performed depending on the requesting degree calculated in the S180. In practice, determination is made based on the fact whether each requesting degree is larger than the corresponding predetermined value or not. The application program of which requesting degree is larger than the predetermined value is added to R-ALST of the application program list explained above. Meanwhile, when the requesting degree is smaller than the predetermined value, R-ALST is never changed.

In the case of FIG. 7, when the requesting degree R1i>R1th, or requesting degree R1j>R2th, the application A1 is selected as the related application (refer to arrow mark I). Moreover, when the requesting degree Rmj>R3th, the application Am is selected as the related application (refer to arrow mark J). In the same manner, when the requesting degree Rni>R4th, the application An is selected as the related application (refer to arrow mark K). The following explanation will be continued under the condition that A1, Am, An are selected as the related applications.

After completion of the process of S190, the process advances to S200.

In the S200, the execution confidence degree is calculated. This calculation is made based on the requesting degree calculated in the S160 or S180. For example, it is thought that an average requesting degree calculated for a plurality of dependency factors is defined as the execution confidence degree. In practice, for example, the execution confidence degree Cp of a certain application program Ap in the dependency table 50a is expressed with the following formula (1), when the requesting degree for the dependency factor Xq(q =1, 2, 3, . . . , Q) is indicated with Rpq, or with apq=1 when the application Ap depends on the dependency factor Xq and with dpq=0 when the application Ap does not depend on the dependency factor xq.

$$Cp=(1/SR)\Sigma(Rpq \cdot dpq) \tag{1}$$

Here, SR=Σdpq and Σ is the sign of sum from 1 to Q. Here, the requesting degree Rpq is assumed to be normalized.

In the next S210, the execution confidence degree is compensated. This process is conducted to compensate for the execution confidence degree using the subordination table 50c explained above.

In the case where the application program selection instruction is issued (refer to FIG. 6), the subordination relationship to the application A1 instructed to be selected having the execution confidence degree of "1" is used and in the case where the application program is not instructed to be selected (refer to FIG. 7), the subordination relationship to the application program having the highest execution confidence degree among the application programs belonging to R-ALST is used. In FIG. 7, for example, when the execution confidence degree of the related application is largest, the execution confidence degree is compensated using the subordination relationship to the related application A1.

In the subsequent S220, the dependency factor value not determined is estimated. This process is executed to estimate the dependency factor value based on the application having the relatively higher execution request.

For example, in FIG. 6, the requesting degrees R1k, Rmk, Rnk for the dependency factor Xk of the application A1 and the related applications Am, An are estimated first. Since the requesting degree for the determined dependency factors Xi, Xj to these applications A1, Am, An is relatively large, R1k, Rmk, Rnk can be estimated as the relatively larger values, for example, as the values exceeding the corresponding predetermined values. Therefore, the dependency factor value satisfying the estimated requesting degrees R1k, Rmk, Rnk can be estimated. Moreover it is thought that the average value of the estimated dependency factor values is determined as the dependency factor value of the dependency factor Xk (refer to arrow mark F). Here, only an average value may be used but the average value using the loading coefficient may also be used considering the degree of dependence. Moreover, this loading coefficient may be replaced with the execution confidence degree of each application program. In FIG. 7 also, the dependency factor value is estimated by estimating the requesting degree for the dependency factor Xk of the related applications A1, Am, An (refer to arrow mark L).

This estimation process will be indicated as follows. That is, the dependency factor value XESTpq for each application Ap is estimated under the condition that the requesting degree Rpq for the dependency factor Xq of the application Ap having higher execution request exceeds the predetermined value Rpqth (Rpq>Tpqth). With the formula (2), average dependency factor value XESTpq is obtained to estimate the dependency factor value XESTq of the dependency factor Xq.

$$XESTq=(1/SA)\Sigma(ap \cdot XESTpq) \qquad (2)$$

Here, $SA=\Sigma ap$, ap is a loading coefficient for the application Ap and the sign $\Sigma$ is the sign of sum from 1 to pmax. The loading coefficient sp may be replaced with the execution confidence degree Cp of the application Ap as explained above.

In the next S230, a control information is generated. That is, the application list as the application information and dependency factor list, dependence vector and dependence characteristic as the dependence information are generated.

In practice, the application list is re-structured based on the execution confidence degree compensated in the S210. That is, when the execution confidence degree C is larger than the first threshold value C1th, its related application is added to E-ALST. Meanwhile, when the execution confidence degree C is smaller than the first threshold value C1th and is larger than the second threshold value C2th, its application is added to R-ALST. When the execution confidence degree C is smaller than the second threshold value C2th, its related application is removed from R-ALST.

Moreover, the dependency factor list is re-structured. The dependency factor in relation to the related application added to E-ALST in the dependency factor added to A-DLST in the S170 is then added to P-DLST.

Moreover, the dependence vector and dependence characteristic for the application programs belonging to R-ALST, E-ALST are respectively generated from the dependency table 50a and dependence characteristic information 50b.

In the next S240, the application list, dependency factor list, dependence vector and dependence characteristic are encoded. In the S250, in addition, the encoded control information is outputted. After completion of the output process of S250, this control information output process is completed.

Here, when a structure is formed to realize the operation of the object apparatus 70 depending on the control information by generating and outputting the control information as explained above, the object apparatus 70 can be totally operated and moreover the semi-automatic set-up.

Figure 8:
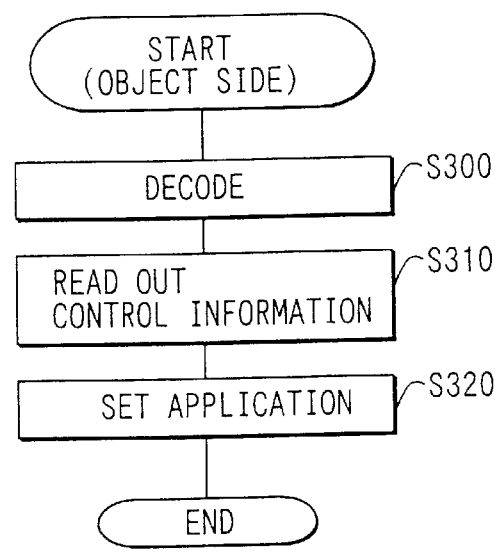
FIG. 8 is a flow diagram indicating a process in an object apparatus side.

Therefore, the process of the object apparatus to be executed at the side of object apparatus 70 will then be explained based on the flow diagram of FIG. 8. Moreover, it is thought that the process is executed with the control apparatus 71 for controlling a plurality of object apparatuses 70.

In the first S300, the control information is decoded. In the first embodiment, the application list, dependency factor list, dependence vector and dependence characteristic are encoded and outputted as the control information as explained above. Here, therefore, these information pieces are sequentially decoded.

In the subsequent S310, the decoded control information is read out.

In the next S320, an application is set and thereafter the process in the object apparatus is completed.

Setting of application in the S320 includes various setting processes of the application programs. Therefore, the setting of application will be explained here.

(7) Setting of Application (7-1) Setting with Application Information

The application program is driven or prepared for drive in response to the user request based on the application list as the application information.

For example, the application program belonging to E-ALST which is determined to be executed is set to the stand-by condition and the application program belonging to R-ALST which is estimated to be requested from a user is set to the access ready condition. The stand-by condition means that the application program is driven through the memory development and thereby it can be used immediately. Moreover, the access ready condition means that the application program is added to the menu or displayed at the heading area of the menu in order to realize immediate selection and drive.

(7-2) Setting Based on Dependence Information

It is determined based on the dependence vector on which dependency fact the application program is requested. Moreover, the requesting degree for the individual dependency factors is determined based on the dependence characteristic to moreover realize customization corresponding to the user request.

For example, it is considered here that the execution confidence degree of the "Facilities Research" application becomes high and execution is determined. In this case, it is determined that whether the search application is requested from the dependency factor "Needs in Life" or from the dependency factor "Favorite Thing" of user. When such request is based on the dependency factor list and dependence vector, the effective dependency factor can be determined. Moreover, when both dependency factors are effective, the requesting degree is calculated using the dependence characteristic. Thereby, the range of search can be limited effectively.

Customization considering the user request includes not only the setting of search condition explained above but also processes in regard to the application program, for example, setting of the object apparatus 70 in which the application program is executed, selection of media content as the processing object of the application program and moreover optimization of description of attribute of a user which is referred from the application program. Setting of the object apparatus 70 includes the setting for changing the image display mode depending on the favorite thing of a user. Moreover, as the selection of media content, automatic selection and reproduction of the desired media contents of a user can be listed as an example, if any designation is not executed from a user, for example, at the time of driving the "Home AV" application. Moreover, it has also been proposed to flexibly describe users, media and systems by forming a dynamic and hierarchical structure through combination of a plurality of tags used in the XML (extensible Markup Language) documents and item description with attribute values. Depending on such description, the system is capable of executing various intellectual processes. Optimization of user attribute description means the optimization of the hierarchical attribute description represented with tag description of XML using the control information explained above.

That is, the application setting process based on the control information enables the operation depending on the situation of object apparatus 70 and operation depending on the application program.

(8) Operation Depending on Situation

As the typical operations depending on situation, following five operations ① to ⑤ can be thought.
① The application program to be selected or the application program set to be selected is changed depending on the situation.
② The application program setting parameter is changed depending on the situation.
③ Format of search attribute in the profile is dynamically changed depending on the situation.
④ Preparation is made depending on the schedule when a user is absent.
⑤ Preparation is executed depending on the dependence characteristic of user when a user is absent.

(9) Operation Depending on Application Program

As the typical operations depending on the application program, following operations ① to ④ can be thought.
① The corresponding input/output device and processing program are selected depending on the application program.
② Combination of media description attribute is changed.
③ Combination of search attribute in the inquiry profile is changed.
④ Data format of each attribute value is changed depending on necessity.

Here, the home electric appliances are considered, and operations depending on the application program will be explained as an example of the centralized control of the television receiver and air-conditioner. In this case, when the television receiver is selected with change of attribute information explained above, the functions for electronic program guide, program selection, volume control, video recording reservation, display area setting and language setting can be set to the stand-by mode by executing the setting for realizing remote control function. When the air-conditioner is selected, operation can be controlled depending on the season, time domain and ambient temperature.

Next, an example of structure of system using the control information output apparatus 1 of the first embodiment will be explained with reference to FIGS. 9A to 9E.

In FIG. 9A, a system is formed in which the control information is outputted to a server apparatus as the object apparatus 70 for executing the database search via the communication I/F from an information terminal as the control information output apparatus 1. In this case, the server apparatus as the object apparatus 70 may be structure, as explained above, to execute the search by effectively limiting the search range based on the dependence information to be outputted.

Moreover, FIG. 9B illustrates a structure that the control information is outputted to a storage or recording medium from an information terminal as the control information output apparatus 1. In this case, the object apparatus 70 reads the control information from the recording medium to perform the operation based on this control information. For example, when a user carries his own information by recording it in the recording medium, a user can automatically operate the object apparatus 70 as a television receiver depending on his taste, for example, at the traveling field.

FIG. 9C illustrates an example of the system for outputting the control information to the control apparatus 71 for controlling a plurality of object apparatuses 70 from the information terminal as the control information output apparatus 1. Here, it is thought that such system is mounted on a vehicle for use. In this case, the object apparatus 70 is considered as the navigation apparatus and mobile apparatus. FIG. 9D illustrates, like FIG. 9C, the control apparatus 71 to control a plurality of object apparatuses 70. This system has a structure that the control apparatus 71 operates by reading the control information via the recording medium.

Moreover, FIG. 9E illustrates a system for transmitting the control information to a plurality of object apparatuses by realizing the control information output apparatus 1 as a remote controller. When the home electric appliances are defined as the object apparatuses 70, such system is very effective.

In the control information output apparatus 1 of the first embodiment as explained above, the object apparatus 70 is detected in unit of the application program to be executed with the object apparatus 70 and the concept as the dependency is introduced into various factors for generating these application programs and user requests. In practice, the dependence characteristic information 50*b* which is the correspondence relationship between the requesting degree to the application program of and the dependency factor value is prepared between each application program and predetermined dependency factor and the dependency table 50*a* indicating on which dependency factor the application program depends has been prepared using such correspondence relationship. Moreover, an application list indicating the application programs having relatively higher execution request is outputted as the application information based on the dependency table 50*a* and dependence characteristic information 50*b* using the dependency factor value determined based on the data obtained with the situation extracting unit 30. In addition, the dependency factor list indicating the dependency factor for generating user request, dependence vector based on the dependency table 50*a* and dependence characteristic based on the dependence characteristic information 50*b* are also outputted. Thereby, a plurality of object apparatuses 70 and various factors for generating user requests to a plurality of such object apparatuses 70 can be totally grasped and overall and semi-automatic set-up of a plurality of object apparatuses 70 can be realized for operation.

Drive and preparation for drive of the application programs depending on the user request at the side of object apparatus 70 can be realized by outputting, for example, the application list.

Moreover, various customizations of the application programs may be realized at the side of the object apparatus 70 by outputting the dependency factor list and dependence vector. In addition, since the dependence characteristic is outputted with inclusion in the dependence information, it is possible to calculate the requesting degree for the dependency factor at the side of the object apparatus 70 and thereby the object apparatus 70 can also be operated through matching with the filing of user as much as possible.

Further, the control information output apparatus 1 of this first embodiment has a structure to output the encoded control information. Therefore, amount of data of control information may be controlled and such structure is particularly effective for the structure to output the control information to the recording medium and profile, etc.

In the first embodiment, the information described in the dependency table 50a (refer to FIG. 3) is the information of two levels indicating "depending on" ("D") condition and "not depending on (blank)" condition. Meanwhile, it is also allowed that multi-level information (dependence degree) indicating the dependence degree is described to each column of the dependency table 50a illustrated, for example, in FIG. 3. For example, the dependence degree is indicated with 11 steps including the highest dependence degree indicated with the level "10", while the non-dependence degree indicated with the level "0". This indication of dependence degree is preferable in that the object apparatus 70 can be operated depending on the feeling of user, because weighing is possible among the dependency factors.

In this case, the dependence vector DP for the application programs can be expressed as DP=(d1, d2, d3, . . . , dQ) under the condition that the dependence degree for the dependency factor $X_q$ (q=1, 2, 3, . . . , Q) is defined as dq. Moreover, in this case, it is also possible that the dependence vector having the dependence degree higher than a certain threshold value is encoded and is expressed with the columns of a set of two items such as (dependency factor number, dependence degree), that is with (i1, di1), (i2, di2), . . . .

Moreover, the first embodiment has a structure to output the dependency factor list, dependence vector and dependence characteristic as the dependence information, but it is also possible to introduce the output to output only the dependence vector as the "dependence information". In such a case, it is sufficient when correspondence between the dependence vector and dependency factor becomes possible at the side of the object apparatus 70. However, the structure to output also the dependency factor list is more preferable because the relatively effective dependency factor can be determined when the dependency factor list is available.

In addition, when the requesting degree is not calculated at the side of object apparatus 70, it is not required to output the dependence characteristic. On the other hand, it is also thought the dependence characteristic information 50b is stored at the side of the object apparatus 70 to calculate the requesting degree because the dependence characteristic becomes almost similar among users. However, when the structure to output the dependence characteristic is formed, the object apparatus 70 can grasp the requesting degree of every user and therefore it is preferable in the point that adequate control may be realized in matching with the request of each user.

Moreover, it is also thought to output the determined dependency factor value with inclusion in the dependence information. It is because the object apparatus 70 is no longer required, in this case, to obtain the dependency factor value.

[Second Embodiment]

An example of a search system configuration using the server apparatus illustrated in FIG. 9A as the object apparatus will be explained as the second embodiment. Particularly, in the second embodiment, the search process utilizing the dependence information will be explained. Moreover efficient search process and flexible use of applications will also be explained.

Figure 10:
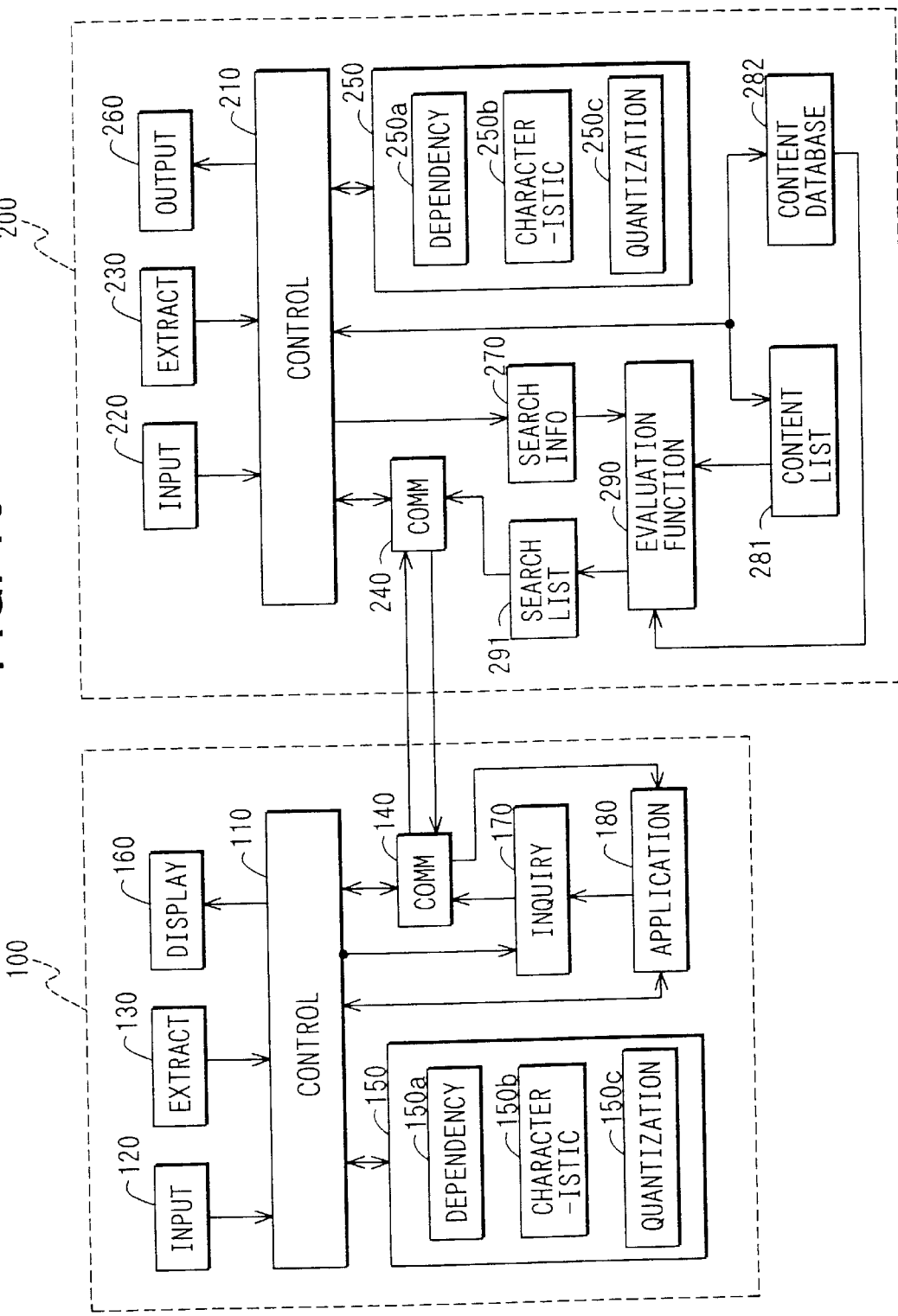
FIG. 10 is a block diagram illustrating a structure of a search system according to a second embodiment of the present invention.

FIG. 10 is a block diagram of the search system as the "information system" of the second embodiment.

The search system is provided with a user terminal 100 as the "control information output apparatus" and a server apparatus 200.

The user terminal 100 comprises a control unit 110, an input unit 120, a situation extracting unit 130, a communication unit 140, a memory unit 150, a display unit 160, an inquiry information generating unit 170 and an application 180. The user terminal 100 can be structured basically in the same manner as the control information output apparatus of the first embodiment. Here, the communication unit 140 for data communication with the server apparatus 200, the inquiry information generating unit 170 for generating the inquiry information for the search and the application 180 to be executed in the user terminal are particularly provided.

Meanwhile, the server apparatus 200 corresponds to the object apparatus 70 in FIG. 1 and comprises a control unit 210, an input unit 220, a situation extracting unit 230, a communication unit 240, a memory unit 250 and an information output unit 260 which are structured like those of the user terminal. Moreover, a search information generating unit 270 for executing the search process, a content list 281, a content database 282, an evaluation function calculating unit 290 and a search list memory unit 291 are also provided.

The content database 282 stores the content including various video data and music data as the search object. The content list 281 is an information list to be used for searching the content. The search information generating unit 270 generates the search information to be used for search process based on the inquiry information from the user terminal 100. The evaluation function calculating unit 290 calculates the evaluation function based on this search information. Depending on the calculation result of the evaluation function calculating unit 290, the search list as the content list of the search result is stored in the search list memory unit 291.

The control units 110, 210 of respective apparatuses 100, 200 are defined as agents to execute the system control via the interface. Moreover, the basic formats of the dependency tables 150a, 250a and dependence characteristic information pieces 150b, 250b are similar to that in the first embodiment.

Next, summary of the search process in the second embodiment will be explained first based on the explanatory diagram of FIG. 11.

Figure 11:
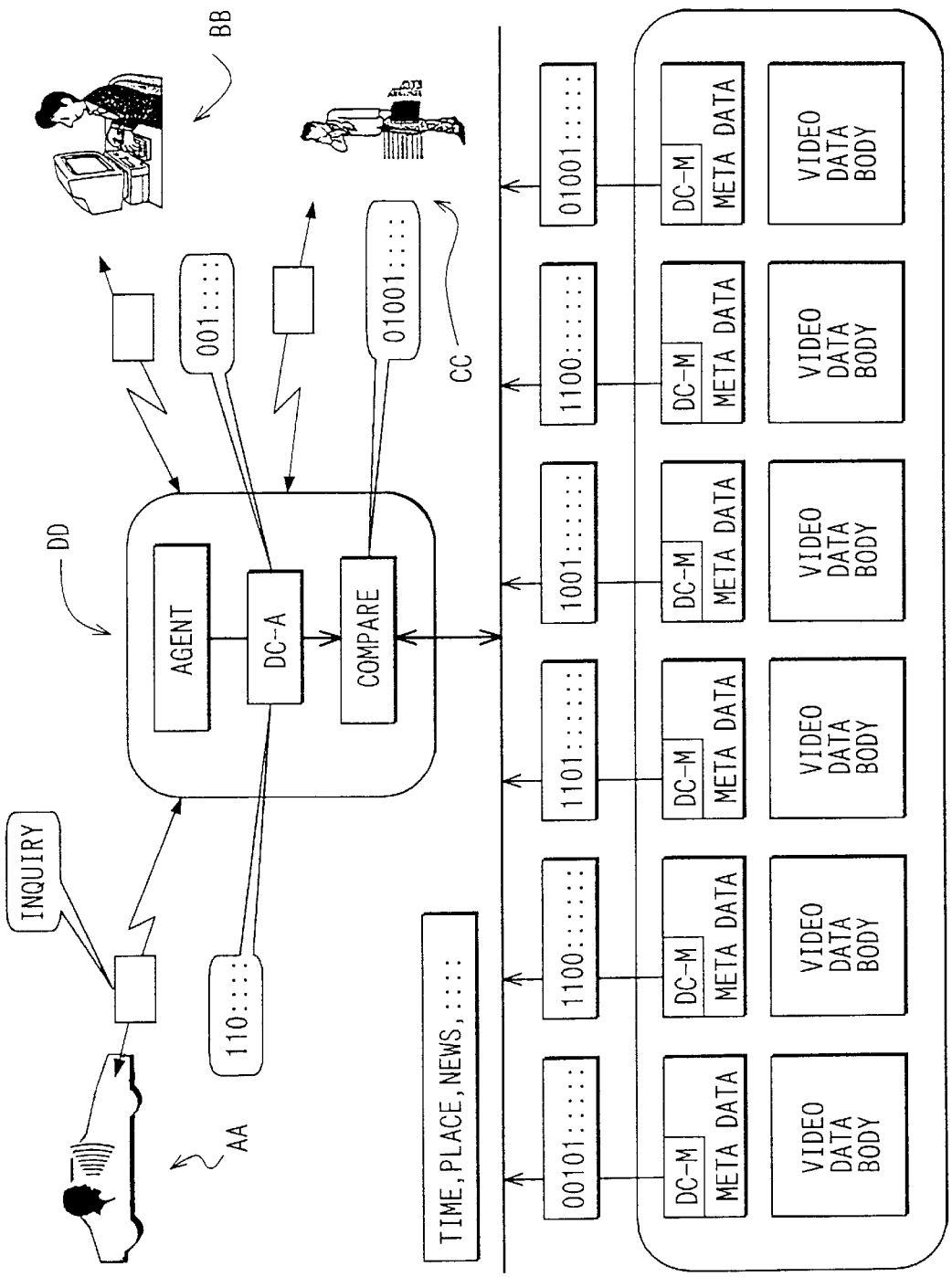
FIG. 11 is an explanatory diagram illustrating an outline of search process.

In FIG. 11, the navigation apparatus mounted on a vehicle indicated with AA, a personal computer indicated with BB and a mobile handset indicated with CC respectively correspond to the user terminal 100. A central apparatus indicated with DD for making data communication among these apparatuses corresponds to the server apparatus 200. This example is a system for searching the video information (content) as the application and each video information comprises the video data body and meta-data as the data describing the video content. The meta-data can be thought as the data for which the standardization effort has been made continuously, for example, in the draft of the International Standards ISO/MPEG7 in relation to the media description format.

The second embodiment is intended to search the video data by including the dependence information to the meta-data and then making comparison with the dependence information from each user terminal 100. This comparing calculation is conducted using the evaluation function. The dependency code is considered as the calculation object. The dependency code will be explained here.

(10) Dependency Code

The dependency code has been obtained through the encoding by extracting the dependency table illustrated, for example, in FIG. 3 in unit of row and this dependency code indicates the dependency factor on which the application depends. This dependency code is identical to description of the dependence vector explained in the item (6) using the code of "1" or "0". Moreover, it has already been described the dependency factor can roughly been sorted to the user factor, system factor and media factor (refer to the item (1-2)). In this second embodiment, a part of the dependency code corresponding to the user factor is defined as the dependency code for user (hereinafter referred to as "DCU") and a part of the dependency code corresponding to media factor is defined as the dependency code for media ("DCM"). In the case where these DCU and DCM are not discriminated, these codes are described only as "DC". Moreover, the dependency code (DC) given to the media is expressed as "DC-M", while the dependency code generated as the user request is expressed as "DC-U". Moreover, the dependency code converted for search in the control unit 210 of the search agent, that is, the server apparatus 200 is expressed as "DC-A" ("A" means the conversion by the agent) for discrimination from DC-U. FIG. 11 illustrates the profile in which DC-U transmitted in the format of the inquiry profile is converted to DC-A with the search agent and is then calculated for comparison with DC-M in the meta-data.

Next, the search process using such dependency code will be explained in more detail.

Figure 12:
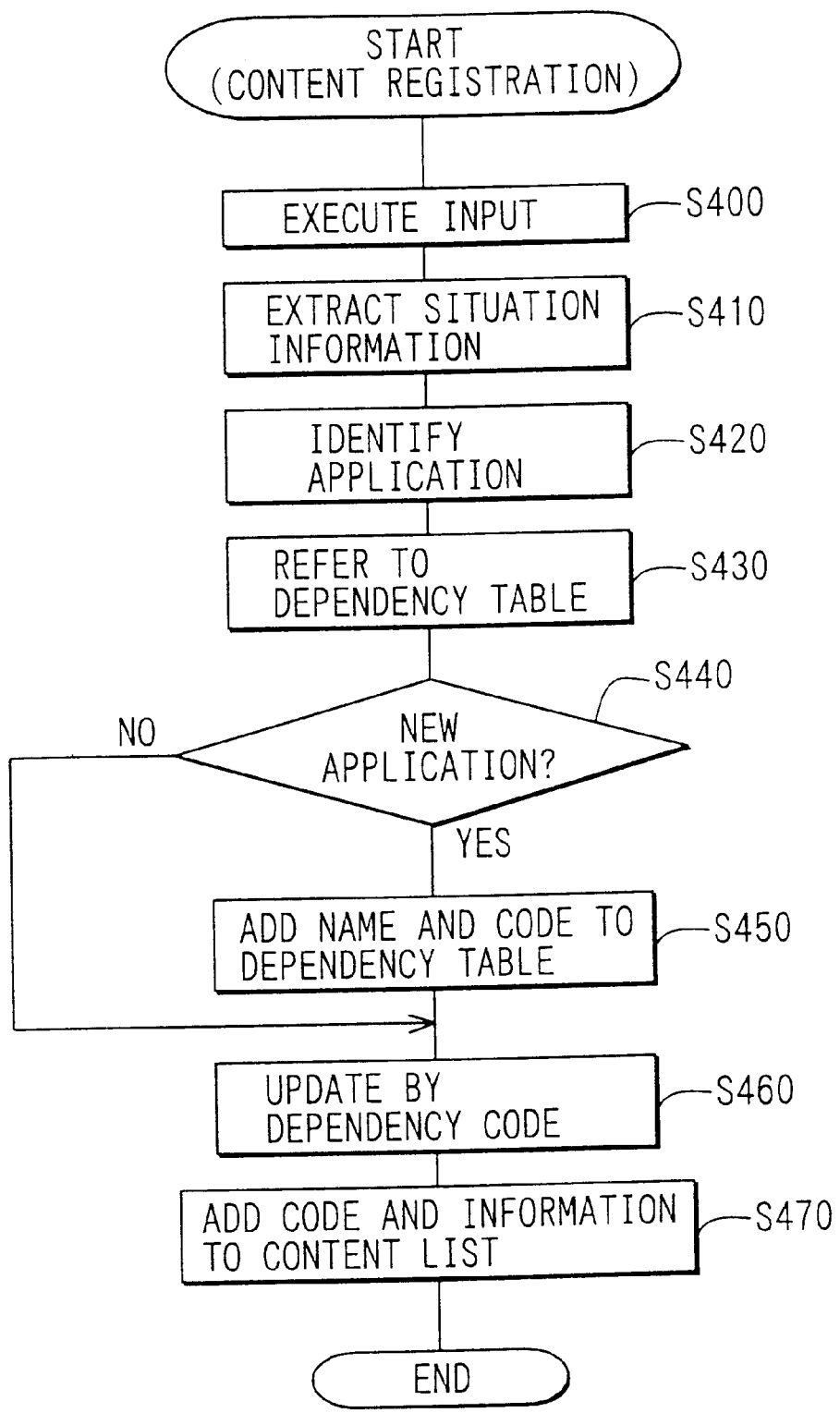
FIG. 12 is a flow diagram indicating a content registration process.

First, the server 200 to execute the search process is structured to execute the content registering process for a creator to register the content of video data or the like. This content registering process will be explained based on the flow diagram of FIG. 12.

When the process is started, a content creator executes the input operation (S400) and the information of the creating condition is then obtained (S410). Input by the content creator is executed via the input unit 220 of the server apparatus 200. On the other hand, the creating condition information is obtained via the situation extracting unit 230.

In the subsequent S420, the application is identified. The application used here means the sorting of the "Weather Information", "Traffic Information", "Karaoke", "Sport Information", "Golf Information", . . . as illustrated in FIG. 3. That is, the content is identified here whether it is, for example, the "Weather Information", or "Traffic Information" from the input information by the content creator and situation information.

Here, the reference is made to the dependency table 250a based on the application identified here (S430). Next, it is determined whether the application is the new application or not (S440). When the application is the new application (S440: YES), the application name and dependency code are added to the dependency table 250a (S450) and thereafter the process advances to the S460. On the other hand, when the application is not a new application (S440: NO), the process advances to the S460 without execution of process of S450.

In the S460, the dependency table 250a is updated by generating the dependency code. Thereafter the generated dependency code and related information are added to the content list 281 and this content registering process is completed in the S470.

Figure 13:
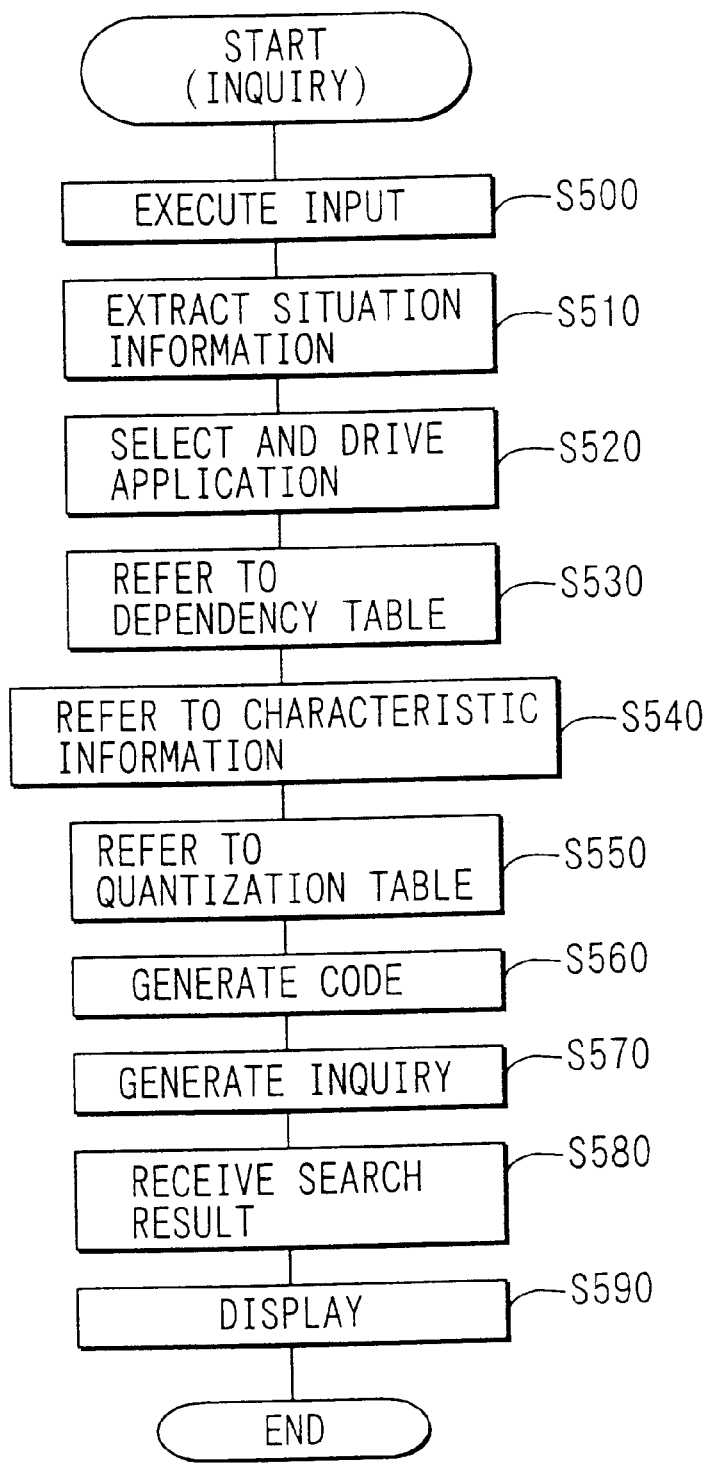
FIG. 13 is a flow diagram indicating an inquiry process.

Next, the inquiry process to be executed in the user terminal 100 will be explained based on the flow diagram of FIG. 13.

In the first S500, a user input is executed. This process is performed via the input unit 120 of the user terminal 100. In the subsequent S510, the situation information is extracted with the situation extracting unit 130. In the next S520, the application 180 is selected and driven as required.

Thereafter, the dependency code is generated in the S560 by sequentially referring to the dependency table 150a, dependence characteristic information 150b and quantization table 150c (S530, S540, S550). This dependency code is DC-U.

In the S570, the inquiry information is generated and transmitted using the generated dependency code (DC-U). Meanwhile, the server apparatus 200 executes the search process based on the inquiry information and returns the search result.

Therefore, the search result is received in the S580 and thereafter the search result is recognized and displayed to complete this inquiry process in the S590.

Next, the search process by the server apparatus 200 will be explained based on the flow diagram of FIG. 14.

First, in the S600, the inquiry information is received. This process corresponds to S570 in FIG. 13. Subsequently, the search information is generated in the search information generating unit 270 (S620) by referring to the quantization table 250c (S610). This search information includes the dependency code (DC-A) for search.

In the next S630, it is determined whether the search information is included or not in the content list 281. For example, when the search information is registered to the list with the content registering process (refer to FIG. 12) explained above, the dependency code (DC-M) and search information such as related information exist in the content list 281. However, the search information of all contents of the content database 282 does not always exist in the content list 281. Here, when it is determined that the search information exists in the content list 281 (S630: YES), the dependency code (DC-M) is obtained (S640) by referring to the content list 281 and thereafter the process advances to the S660. On the other hand, when it is determined that the search information does not exist in the content list 281 (S630: NO), the dependency code (DC-M) is obtained (S650) through the meta-data analysis and thereafter the process advances to the S660.

In the S660, the evaluation function based on the dependency code is calculated and thereafter a list of content satisfying a certain evaluation reference is generated as the primary search list (S670). The content evaluation by this evaluation function will be explained later.

In the S680, whether the primary search is completed or not is determined. Here, when the primary search is determined to be completed (S680: YES), the secondary search with the meta-data is performed (S690) to select the content (target content) as the final search result. In the search result is distributed in the S700, and thereafter this search process is completed.

As explained above, the search process of the second embodiment is characterized by executing the content evaluation based on the dependency code (DC). Therefore, the method of content evaluation will be explained next.

(11) Evaluation of Content
(11-1) Evaluation Function

The content evaluation function is defined, as expressed by the formulae (3) and (4), as the inner product calculation of the load vector W indicating the requested specification from the user terminal 100 and the dependence characteristic SC11 indicating the content characteristic of the content C1 stored in the server apparatus 200.

$$JC1 = \Sigma Wk \cdot SC1k(Nk) \qquad (3)$$

$$Nk = Int(Xk/Qk) \qquad (4)$$

Here, $\Sigma$ is a sign of sum of 1 to N. Moreover, each variable is defined as explained below.

Xk: k-th factor value;

Qk: Quantization coefficient for k-th factor value;

Nk: Value obtained by quantizing the k-th factor value;

C1: $1^{st}$ content on the database;

JC1: Evaluation value indicating applicability of content for request for factor group $\{X1, \ldots, Xk\}$;

Wk: Load coefficient to be switched depending on the Situation (environment of user request, user/communication/Terminal/media);

SC1k(Nk): Dependence characteristic indicating the application degree of C1 for factor Xk;

Here, SC1k is equal to the requesting degree Rn to the application. Therefore, it can be described as Rn(Xk). Here, Rn(Xk) means the requesting degree to the application An for the factor value Xk.

Moreover, quantization of factor value means the process for detecting, for example, the continuous time information as the information indicating "Morning", "Daytime", "Night" and "Spring", "Summer", "Autumn" and "Winter". The information in relation to the quantization is described in the quantization tables 150c, 250c provided in the user terminal 100 and server apparatus 200.

(11-2) Simplification of Evaluation Function

A general evaluation function is indicated in the item (11-1). That is, the load vector takes a general format of the dependence vector in which each element can take multiple levels. Moreover, the SC1 is the dependence characteristic and can also be expressed with a graph (refer to FIG. 4) indicating rise of requesting degree for the dependency factor value.

However, when the number of contents is considerably large, that is, when the contents exist in the order, for example, of million, if the evaluation function of formula (1) is used, it becomes difficult to return the search result to the user terminal 100 within a short period of time. Therefore, it can be thought that the evaluation function is described in the simplified format as described below.

① For example, it can be thought that the load coefficient W is replaced with the dependency code d(DC-A described above) as expressed with the following formula (5).

$$JC1 = \Sigma dk \cdot SC1k(Nk) \qquad (5)$$

Thereby, since dk is "1" or "0", the multiplication of K times can be saved for one content.

② In the same manner, it is also thought that SC1k(Nk) is replaced with the dependency code dC1k (DC-M explained above) as expressed with the formula (6).

$$JC1 = \Sigma Wk \cdot dC1k \qquad (6)$$

③ Of course, both may be replaced with the dependency code, that is as expressed with the following formula (7).

$$JC1 = \Sigma dk \cdot dC1k \qquad (7)$$

④ Moreover, it can also be thought that the evaluation value JC1 takes two levels of "0" and "1" as expressed in the formula (8).

$$JC1 = \sum boolean\ dk \cdot dC1k \qquad (8)$$
$$= (d1\ \text{AND}\ dC11)\ \text{OR}\ (d2\ \text{AND}\ dC12)\ \text{OR}$$

In the content evaluation process explained later, the evaluation function expressed with the formula (7) is used.

(11-3) Encoding of Dependence Characteristic by Multi-level Expression

Figure 15:
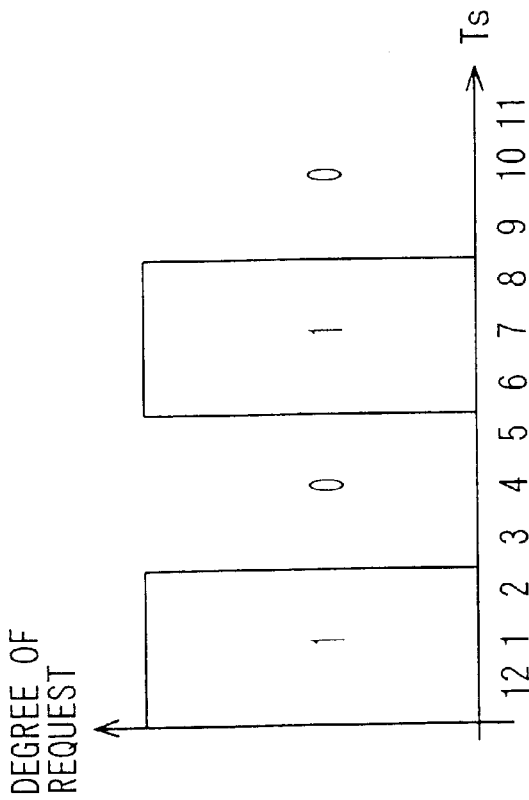
FIG. 15 is an explanatory diagram illustrating a method of expressing the dependence corresponding to a dependence property factor value.

It is also thought that the attribute factor (lateral axis) and requesting degree (vertical axis) are quantized for multi-level expression as illustrated in FIG. 15 as the expression of intermediate level of SC1k(Nk) and dC1k at the time of describing the dependence characteristic of content. In this case, it is determined that dependency exists in all cases (11 kinds of cases) other than 0000 and 1111. Here, when the number of quantizing steps is sufficiently small, the dependence characteristic, that is, the requesting degree for dependency factor can be encoded with only one numerical value dC1k which can take multi-level value. Therefore, not only existence or non-existence (absence) of dependency but also matching or non-matching with the value of inquiry attribute can be determined simultaneously (without analysis of metadata). In this case, it is enough to decode dC1k before calculation of the evaluation function. For example, the code to express the dependence characteristic of FIG. 15 is expressed as "1010" with the binary expression or as "6" with the decimal expression but the corresponding value "0" is substituted as the value of dependence characteristic to the Nk=N1TS (Spring) for the calculation of evaluation function. Thereby, it can be determined that the dependency exists. The dependence characteristic value SC1k(1)=0 can simultaneously be obtained and moreover the result similar to the secondary search result "dependency exists but it is not the search object" can be obtained with single evaluation calculation for the search request for "video content expressing the Spring". Here, NjTS=0/1(j=0, 1, 2, 3). However, the requesting degree on the vertical axis can of course be expressed with multi-level value.

On the other hand, in this case, there arises a difficulty for generation of job for defining characteristic of each content as in the case of the formula (1). For such difficulty, a table for uniquely replacing the language expression of "expressing the Spring" with the multi-level dependency code dC1k as will be described is defined and thereby such job can remarkably be alleviated.

(11-4) Efficient Evaluation of Content

① Giving the Priority Sequence

The priority sequence among the dependency factors is determined in the $\Sigma$ calculation of the calculation for evaluation function indicated as the formulae (3) to (8). For example, the request vector of the time, place and highest priority attribute is not "0", reference is made to the attribute value before completion of the evaluation function calculation. If attribute value is different from the request, it is thought to cancel the evaluation function calculation at that time. It can particularly be effective for improvement of search efficiency when a large number of contents exists.

② Limitation of Range

It is also thought that the calculation factor can be limited from the beginning depending on the kind of situation and application in the $\Sigma$ calculation of the evaluation function calculation indicated with the formulae (3) to (8).

③ Application of DC Management Table

Figure 16:
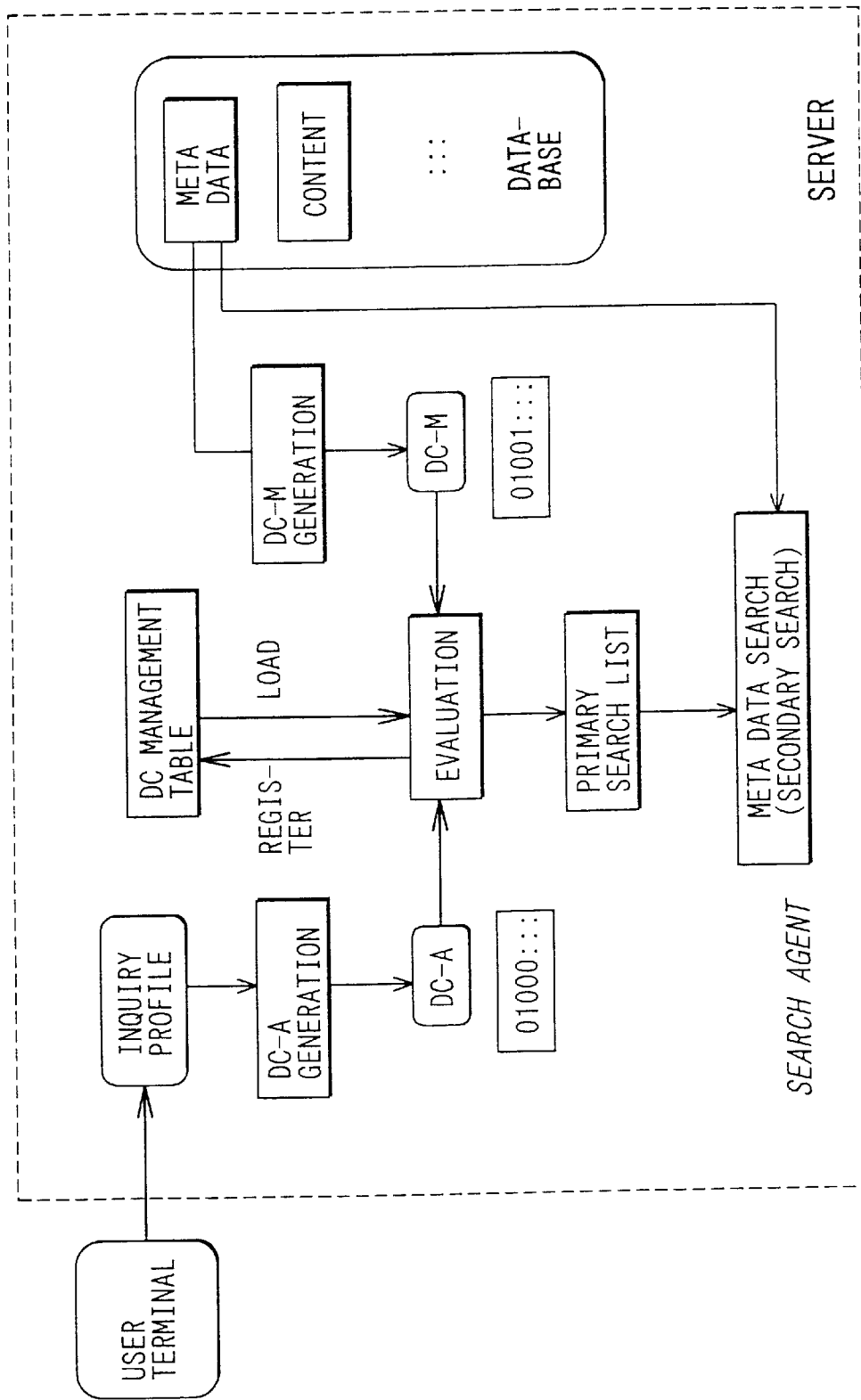
FIG. 16 is an explanatory diagram illustrating the reuse of a dependence code based on a DC management table.

The DC management table means the table of the generated dependency code. As illustrated in FIG. 16, the dependency code DC-M which is once generated is registered to the DC management table and the dependency code DC-M is loaded from this DC management table in order to use it for search. For example, data set of the DC management table can be expressed as follow.

[Content Number, Application Name, Dependency Code and Access Record]

The content list 281 is generated with the content registering process explained above and the search information such as dependency code is stored in the this content list 281 as explained above. The idea of using the DC management table is intended not only to registration of content but also registration of the dependency code (DC-M) obtained during the search process through the meta-data analysis. Therefore, the DC management table can be considered as one structure element of the content list 281.

The primary search process and the secondary search process used for meta-data analysis will be further explained. Subsequently, a practical example of the content evaluation process will then be explained.

Figure 17:
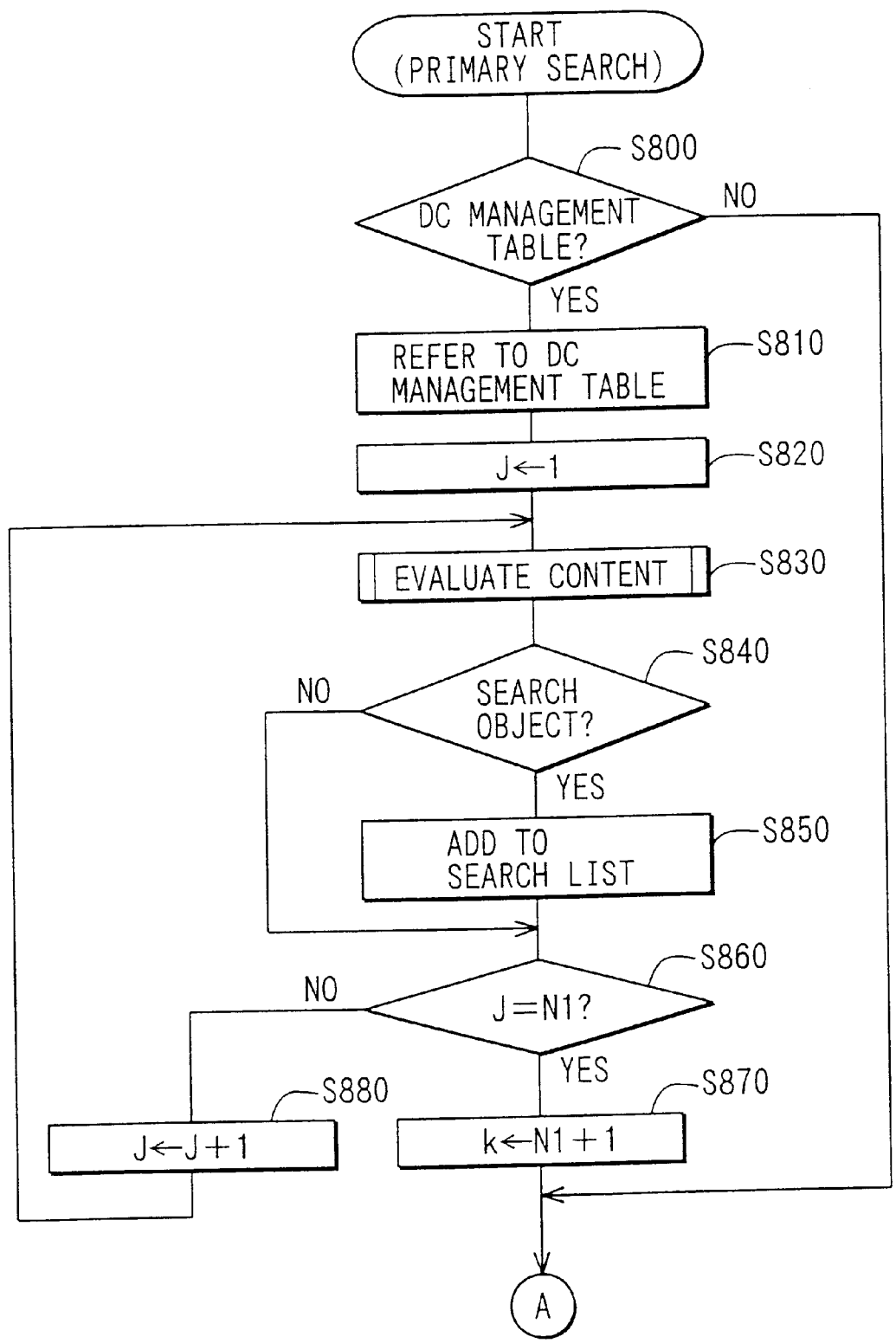
FIG. 17 is a flow diagram indicating the former half of a primary search process.

FIG. 17 is illustrates the flow diagram indicating in detail the primary search process using the DC management table. This primary search process corresponds to the processes of S630 to S680 of FIG. 14.

In the first S800, whether the DC management table exists or not is determined. When the DC management table is already generated, the determination result is YES. When the existence of the DC management table is determined (S800: YES), the process advances to the S810. Meanwhile, when it is determined that there is no DC management table (S800: NO), the process advances to the S890 of FIG. 18.

In the S810, reference is made to the DC management table. Thereby, the dependency code (DC-M) is read.

In the subsequent S820, a variable J is initialized to "1". This variable J is used for counting up the contents as the search object.

Next, in the S830, the content evaluation is executed. Detail will be explained later but here DC-M and DC-A are compared.

It is determined with the comparison process in the S830 that the search object is defined or not defined. When the search object is defined (S840: YEST), such content is added (S850) to the primary search list and the process advances to the S860. If the search object is not defined (S840: NO), the process advances to the S860 without execution of the process of S850.

In the S860, it is determined that the variable J is identical to the constant N1 or not. This constant N1 indicates the number of contents wherein the dependency codes are stored in the DC management table. Here, when J=N1 (S860: YES), the value equal to N1+"1" is substituted to the variable k (S870) and the process advances to the S890 of FIG. 18. On the other hand, when J is not identical to N1 (S860: NO), the variable J is incremented (S880) and the process is repeated from the S830.

Figure 18:
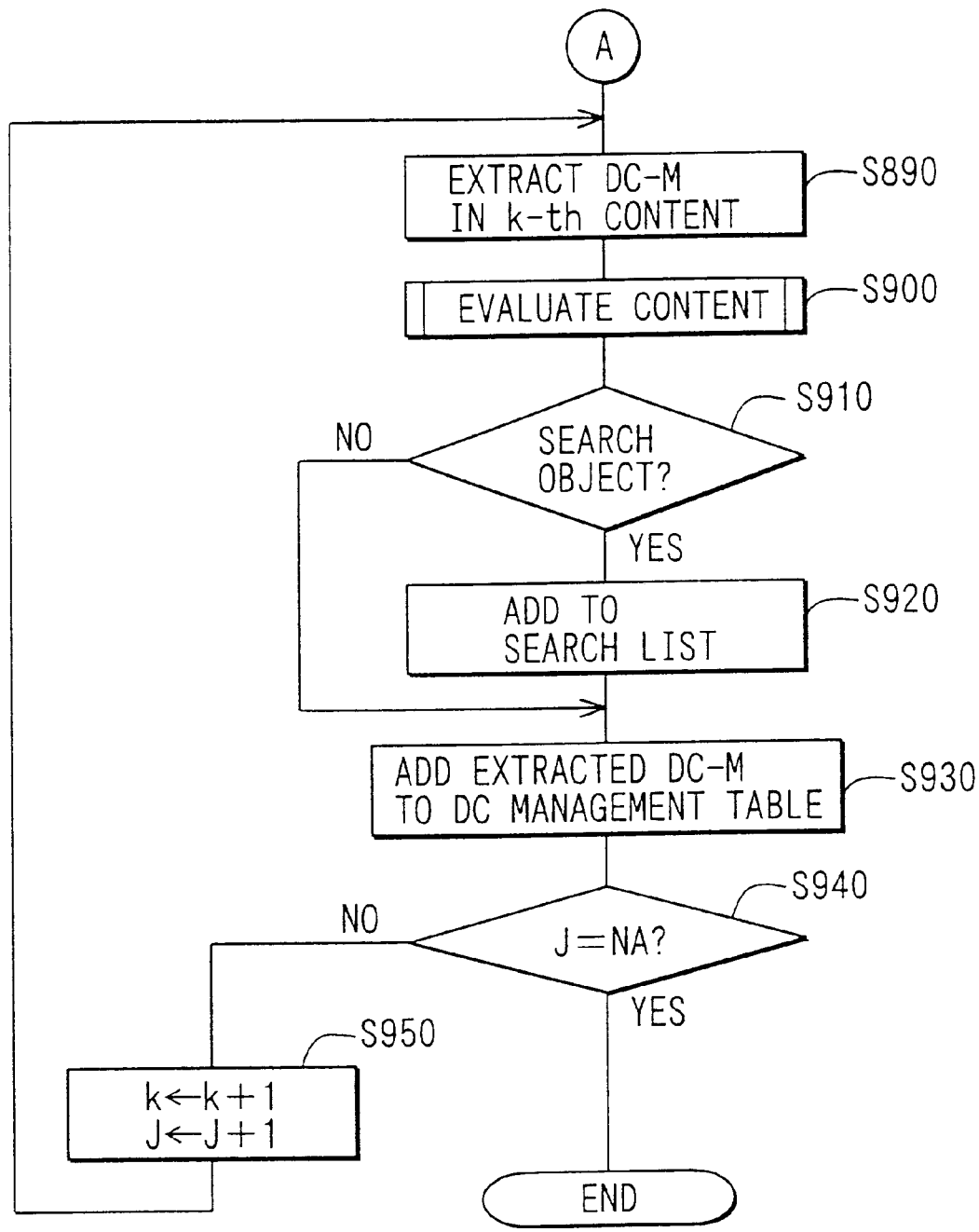
FIG. 18 is a flow diagram indicating the latter half of the primary search process.

In the S890 of FIG. 18, the dependency code (DC-M) of the k-th content is extracted by analyzing the meta-data. In the subsequent S900, content evaluation is performed. This process is similar to that of the S830 of FIG. 17. Therefore, when the search object is defined (S910: YES), such content is added to the primary search list (S920) and the process advances to the S930. Meanwhile, when the search object is not defined (S910: NO), the process advances to the S930 without execution of the process of S920.

The dependency code (DC-M) extracted with the meta-data analysis as explained above is added to the DC management table in the S930. With addition of this dependency code (DC-M), the constant N1 explained above is also incremented.

In the next S940, whether the variable J is equal to the constant NA or not is determined. This constant NA is the total number of contents as the search object. When J=NA (S940: YES), that is, when the primary search is completed, this primary search process is completed. On the other hand, when J≠NA (S940: NO), that is, when the primary search is not yet completed, the variable k and variable J are incremented (S950) and the processes from the S890 are repeated.

Next, the secondary search process by the meta-data analysis will then be explained in more detail.

Figure 19:
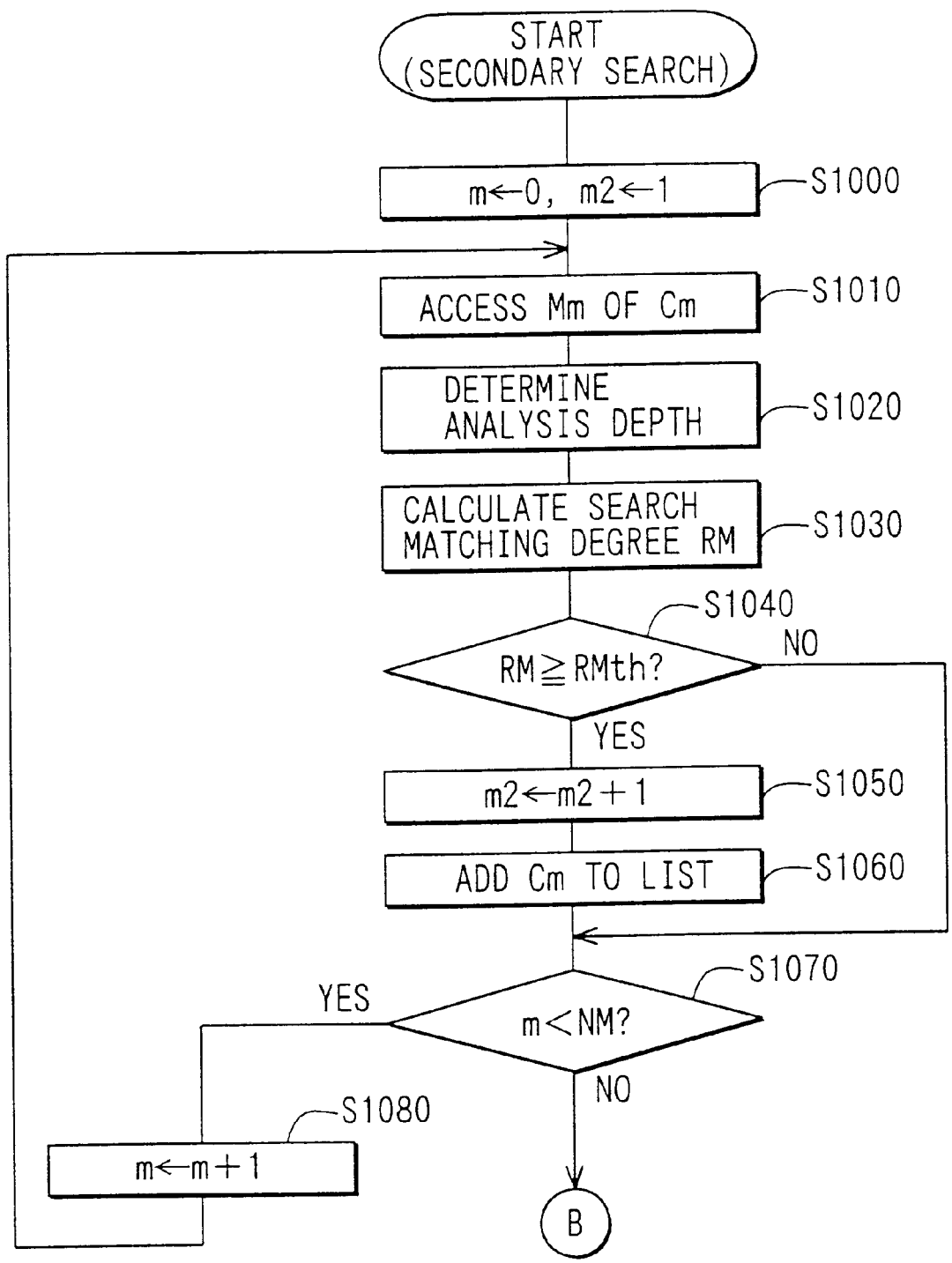
FIG. 19 is a flow diagram indicating the former half of a secondary search process.

FIG. 19 is the flow diagram indicating in detail the secondary search process using the DC management table. This secondary process corresponds to the processes of the S690 and S700 of FIG. 14.

First, in the S1000, the variable m is initialized to "0" and the variable m2 is initialized to "1".

In the subsequent S1010, access is made to the meta-data Mm of the content Cm and the depth of the analysis is determined in the next S1020. In the subsequent S1030, the level determined in the S1020 is analyzed to calculate the search application degree RM. Such meta-data analysis is executed with various methods.

In the next S1040, whether the search matching degree RM is higher than the threshold value RMth or not is determined. Here, when RM≧RMth (S1040: YES), the variable m2 is incremented (S1050), content Cm is added to the search list (S1060) and the process advances to the S1070. On the other hand, when RM<RMth (S1040: NO), the process advances to the S1070 without execution of the processes of S1050 and S1060.

In the S1070, whether the variable m is smaller than the constant NM or not is determined. This constant NM is the number of contents stored in the primary search list. Here, when m<NM (S1070: YES), that is, when the meta-data of the content stored in the primary search list are all not yet analyzed, the variable m is incremented (S1080) and the processes are repeated from the S1010. Meanwhile, when m=NM (S1070: NO), that is, when all of the meta-data of content stored in the primary search list are analyzed completely, the process advances to the step S1090 of FIG. 20.

The processes from the S1090 indicate the processes for distribution of contents added to the search list. Here, existence or non-existence of the summarizing operation and encoding system are determined for each content to conduct the distribution process in response to the contents and user requests.

Figure 20:
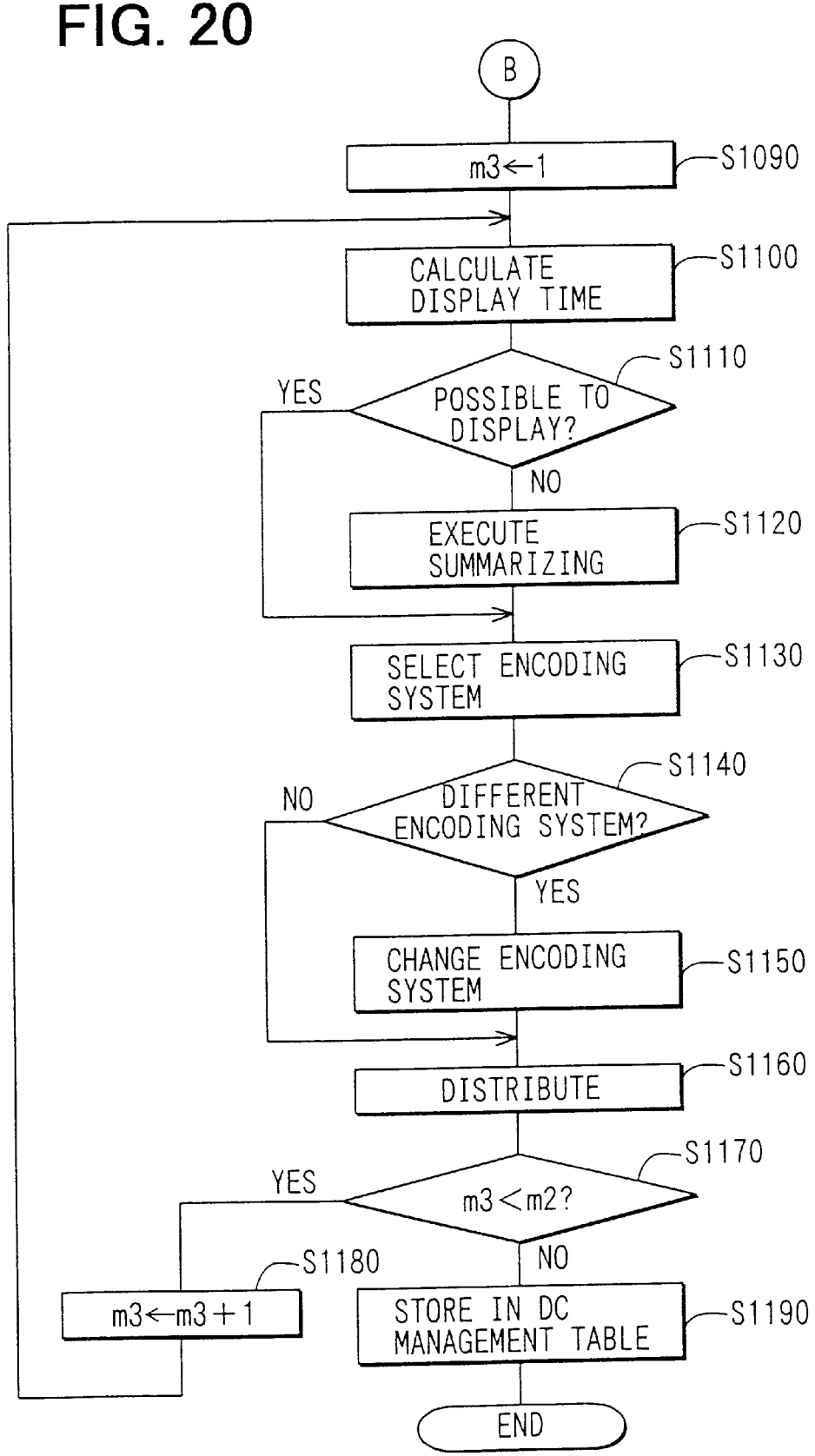
FIG. 20 is a flow diagram indicating the latter half of the secondary search process.

In the S1090 of FIG. 20, the variable m is initialized to "1". In the subsequent S1100, the content display time is calculated. Here, the display time of video data is calculated under the precondition that the video data is set as the search object.

In the next S1110, whether the display is possible within the predetermined time or not is determined. Here, when display within the predetermined time is impossible (S1110: NO), the summarizing operation is executed in the S1120 and thereafter the process advances to the S1130. On the other hand, when display within the predetermined time is possible (S1110: YES), the process advances to the S1130 without execution of the process in the S1120.

In the S1130, the encoding system is selected in response to the selected content. In the next S1140, whether the encoding system of the current source is different from the encoding system selected in the S1130 or not is determined. When it is determined that the encoding system is different (S1140: YES), the encoding system is changed (S1150), the distribution process to the user terminal 100 is executed (S1160) and thereafter the process advances to the S1170. Meanwhile, when it is determined that the encoding system is identical (S1140: NO), the distribution process to the user terminal 100 is executed (S1160) without execution of the process of the S1150 and thereafter the process advances to the S1170.

In the S1170, whether the variable m3 is smaller than the variable m2 or not is determined. The variable m2 is the number of contents described in the search list. Here, when m3<m2 (S1170: YES), that is, when there exists the contents not distributed, the variable m3 is incremented (S1180) and the processes from the S1100 are repeated. Meanwhile, when m3=m2 (S1170: NO), the process advances to the S1190 when all contents are distributed.

In the S1190, the newly generated items are stored in the DC management table and thereafter this secondary search process is completed.

Figure 21:
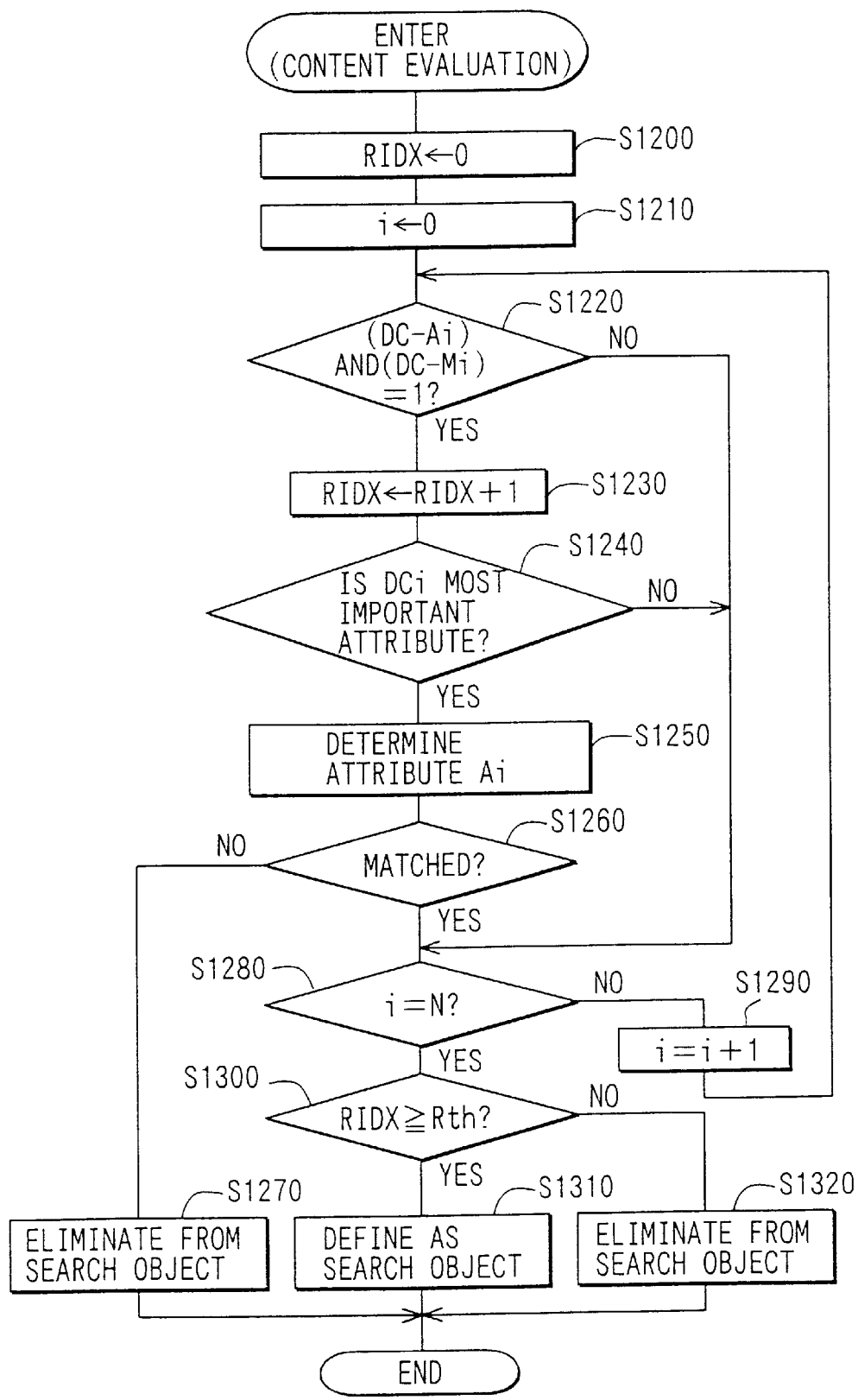
FIG. 21 is a flow diagram indicating a content evaluation process.

Subsequently, the content evaluation process will be explained based on the flow diagram of FIG. 21. The content evaluation process is called in the S830 of FIG. 17 and S900 of FIG. 18.

First, in the S1200, the value "0" is substituted to the variable RIDX for the initialization. In the subsequent S1210, the variable "i" is initialized to "0".

In the subsequent S1220, whether the logical product between the i-th element of the dependency code (DC-A) and the i-th element of the dependency code (DC-M) is "1" or not is determined. Here, when (DC-Ai)AND (DC-Mi)=1 (S1220: YES), the process advances to the S1230. Meanwhile, when (DC-Ai)AND(DC-Mi)≠1 (S1220: NO), the process advances to the S1280.

In the S1230, the variable RIDX is incremented. In the subsequent S1240, whether the i-th element (Dci) of the dependency code (DC) is the most important attribute or not is determined. When DCi is the most important attribute (S1240: YES), the meta-data is analyzed in this timing to determine the value of the attribute Ai (S1250). Thereafter, the process advances to the S1260. Meanwhile, when DCi is not the most important attribute (S1240: NO), the process advances to the S1280.

In the S1260, whether the value of the attribute Ai determined in the S1250 is matched with the search condition or not is determined. When matching with the search condition is determined (S1260: YES), the process advances to the S1280. Meanwhile, matching with the search condition is not determined (S1260: NO), this content is not concluded as the search object (S1270) and this content evaluation process is completed. That is, when the attribute value of the most important attribute is not matched with the request, the content evaluation is cancelled. Thereby, content evaluation can be executed efficiently.

In the S1280, whether the variable i is identical to the constant N or not is determined. This constant N is the number of dependency factors. Here, when i=N (S1280: YES), that is when the logical product is calculated for all dependency factors, the process advances to the S1300. Meanwhile, when i≠N (S1280: NO), that is when the dependency factors of which logical product is not yet calculated exist, the variable i is incremented (S1290), the processes from the S1220 are repeated.

In the S1300, whether the variable RIDX is higher than threshold Rth or not is determined. Here, when RIDX≧Rth (S1300: YES), the content is defined as the search object (S1310). Thereafter, the content evaluation process is completed. Meanwhile, when RIDX<Rth(S1300: NO), the content is not defined as the search object (S1320) and this content evaluation process is completed.

In the content evaluation process explained above, following variations may be thought.

(a) In the process explained above, each element has been calculated using the dependency code (DC-A, DC-M) taking the value of "0" or "1". However, it is also possible to use the load vector W and the dependence characteristic SC1 expressed in the formula (3) for the calculation. Thereby, the important level of each element (attribute) can be expressed.

(b) Moreover, calculation has been executed sequentially from the i-th element by incrementing the variable "i". However, it is also possible to specify the element of the i-th calculation with the number J(i) by introducing the priority sequence in place of specifying the calculation sequence with the variable i. For example, when J(1)=3, J(2)=6, J(3)=1, . . . , the logical calculation is executed in the sequence of the third element, sixth element and first element, . . . Thereby, the attribute having the higher importance degree can be calculated earlier.

Next, the effect of this embodiment in the search process in which the content of the search object selected with the process explained above is embodied and the dependency code is used will be explained below.

(14) Content (14-1) Worth of Content

In the case of an example where the video data is considered as the content, the dependency code (DC-M) for expressing content at the side of server apparatus 200 can be defined as the code for the following dependency factor.

$$dC1=(dTs, dXs, \ldots)$$

dA: Code indicating whether worth of content depends on the dependency factor A or not. The value "1" indicates dependence, while "0" indicates no-dependence.

Ts: Scene time. Time information of the scene indicated with the object content.

Xs: Scene place. Place information of the scene indicated with the object content.

(14-2) Worth of Content in the Video Search

On the occasion of evaluating the content as the video data expressed with the dependency code (DC-M) indicated in the item (14-1), it is thought to execute the worth determination as indicated below.

For example, in the case where the worth of the scene "Rural landscape, April 12" is determined based on the photographing date and time of the scene, this scene has the worth as the "Scene of the Spring" (satisfying the request). In this case, dependency on the time is expressed as a rise of requesting degree mainly for April. Meanwhile, the worth is not so high as the "Scene of the Winter". This will be expressed using the graph as illustrated in FIG. 22.

Moreover, in the case where the worth of the scene "Karuizawa, August" is determined based on the photographing place and season, this scene has the worth, for example, as the "Sightseeing spot scene near Karuizawa in the Summer" (satisfying the request). In this case, dependency on the time is expressed as a rise of requesting degree mainly for August. The worth of this scene is low as the "Scene expressing the Winter" and "Scene expressing the Spring". Moreover, dependency on place is expressed as a rise of the requesting degree mainly for the spot which is near Karuizawa recalling the resort area and sightseeing area.

Moreover, the "Video Manual for Machinery" and "Explanation Video of Emergency Evacuation in the Aircraft" produced in the Spring do not correspond to the "Scene expressing the Spring".

In these examples, the language expression "Scene expressing the Spring" can be thought that the numerical expression of the dependence characteristic R(Ts) in FIG. 22 is encoded with the high efficiency encoding method.

When considering these examples, for the strict video search, it is preferable for each content to express not only the dependence or non-dependence on the dependency factor such as scene time but also dependence characteristic R(Ts) indicating a rise of requesting degree to the dependence factor value.

However, it is actually difficult to realize such expression to all of a large amount of databases. Based on the subjectivity of a person, the dependency and dependence characteristic are patterned with the language expression ("expressing the Spring"). Such language expression may be described in the meta-data of content. However, it is not easy to discriminate the meaning in common, automatically, quickly and accurately for every kinds of computers and devices and the content database having a larger capacity. For example, in the case of the request for the scene of (Spring, Paris), it is thought that the seasonal determination of $\alpha<Ts<\beta$ is executed for the time value T2. Thereafter the similar inequality determination is also required for the space coordinate value. However, it is not easy to strictly define the upper limit, lower limit and setup condition of such inequality for all users and applications.

Therefore, ideally, the present embodiment is intended to enhance the efficiency of the primary search with the code expression of existence or non-existence of the dependency of each attribute, in place of searching deeply from the beginning the meta-data of the content described with the numerical expression and language expression of the dependence characteristic. For example, it is very difficult to specify in detail, with the graph of the dependence characteristic indicated in the columns of FIG. 23 or with the language expression, what a rise of requesting degree the applications of scene, that is, the applications which may be sorted to "Sightseeing Information/Hotel Information", "Repair Manual of Machinery", "Sightseeing Information/Traffic Congestion Information" and "Idol Video/Commercial" have for the user factors "Time", "Place" and "Weather" and the media factors "Scene Time", "Scene Place", "Actor in the Scene" and "Feeling of the Scene". Moreover, the time required for the search becomes tremendously long. Therefore, the worth determination is conducted using the dependency code, although it is also indicated in the columns, "1" indicating dependence, "0" indicating non-dependence and "X" indicating non-determination.

This basic policy can of course be employed in common for the applications other than the video content.

(14-3) Worth of Content in Music Search

Music search other than, for example, the video search will then be explained.

In the case of music search, evaluation for conformity to the feeling of a user changing from time to time is necessary. Dependence on the feeling may be thought based on the following dependency factor. This can be generalized as the definition of feeling.

Fu: Feeling of user {refreshing, pleasant, dark, sad, vital, etc.}
Fm: Feeling which a music has {calm, passionate, pop, Bright, etc.}

It is possible to know the tendency "what feeling a user who likes this music has?" by setting up the correspondence between Fu and Fm when a certain music is searched using such dependency factor.

Moreover, the user time Tu, user place xu, artist Ar or the like can be considered as the dependency factor for the music search.

(14-4) Automatic Sorting of Content

It is difficult to uniquely determine the typical value of content. However, the characteristic which is defined as the reference for worth determination of content can be given semi-automatically and the contents, for example, up-loaded to the site can also be sorted by considering the contents with the concept of dependency. When the dependency table is provided in the site, the related application may be identified through comparison with the dependency code in the table.

For example, it is thought as an example to generate the dependency code to register the content with the content registering process (refer to FIG. 12) as explained above. Similarly, when the content up-loaded from the user terminal 100 has a structure allowing automatic sorting, it is now possible to conduct management of all contents to be stored in the database.

Figure 24:
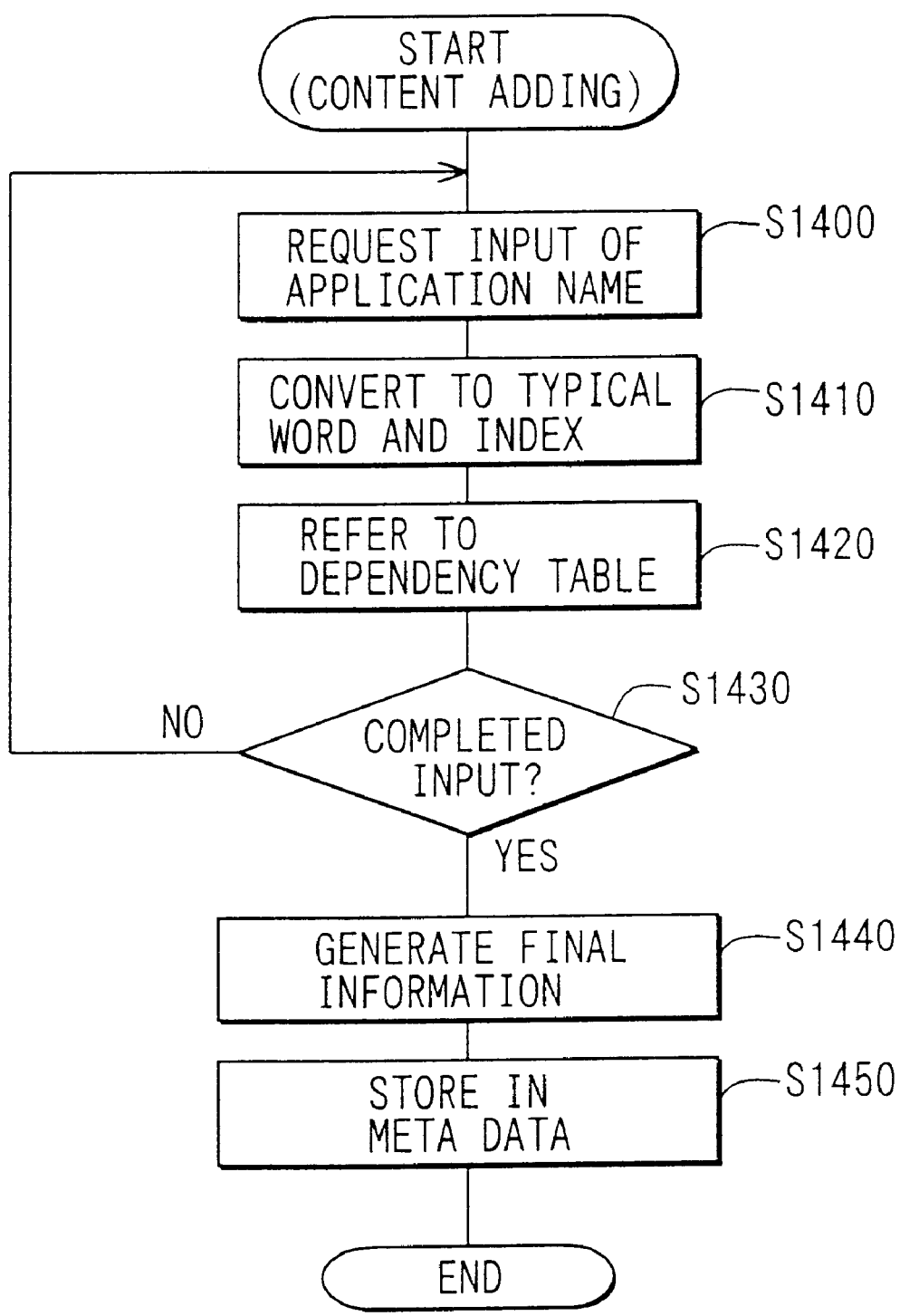
FIG. 24 is a flow diagram indicating a content addition process.

For example, it is thought that the server apparatus 200 is structured to execute the content adding process as illustrated in FIG. 24.

Here, when the process is started, input of the application name is first requested (S1400). When the application name is inputted, it is then converted to the typical words and index described in the dependency table 250*a* (S1410) and the dependency code is acquired by referring to the dependency table 250*a* (S1420). When the application name "Video Information of a Shop", for example, is inputted, it is replaced with the typical words "Restaurant Information" in the dependency table 250*a* and the dependency code in relation to these words is acquired. Conversion to the typical words/index from the application name may be realized, for example, by preparing the correspondence relationship of the table or the like.

In the next S1430, whether the application name is inputted or not is determined. When completion of input is determined (S1430: YES), the process advances to the S1440. Meanwhile, if the input is not completed (S1430: NO), the processes from the S1400 are repeated. Thereby, if a plurality of application names are inputted, reference is made to a plurality of dependence information from the dependency table 250*a* and proper estimation of dependence information is possible for new applications.

In the S1440, the final dependence information is generated and this information is stored in the meta-data and this content adding process is completed in the S1450.

Next, a practical example of the dependency factor in the dependency code (DC-U, DC-A, DC-M) when the user terminal 100 is realized as the vehicle information apparatus such as the navigation apparatus will be explained below.

Figure 25:
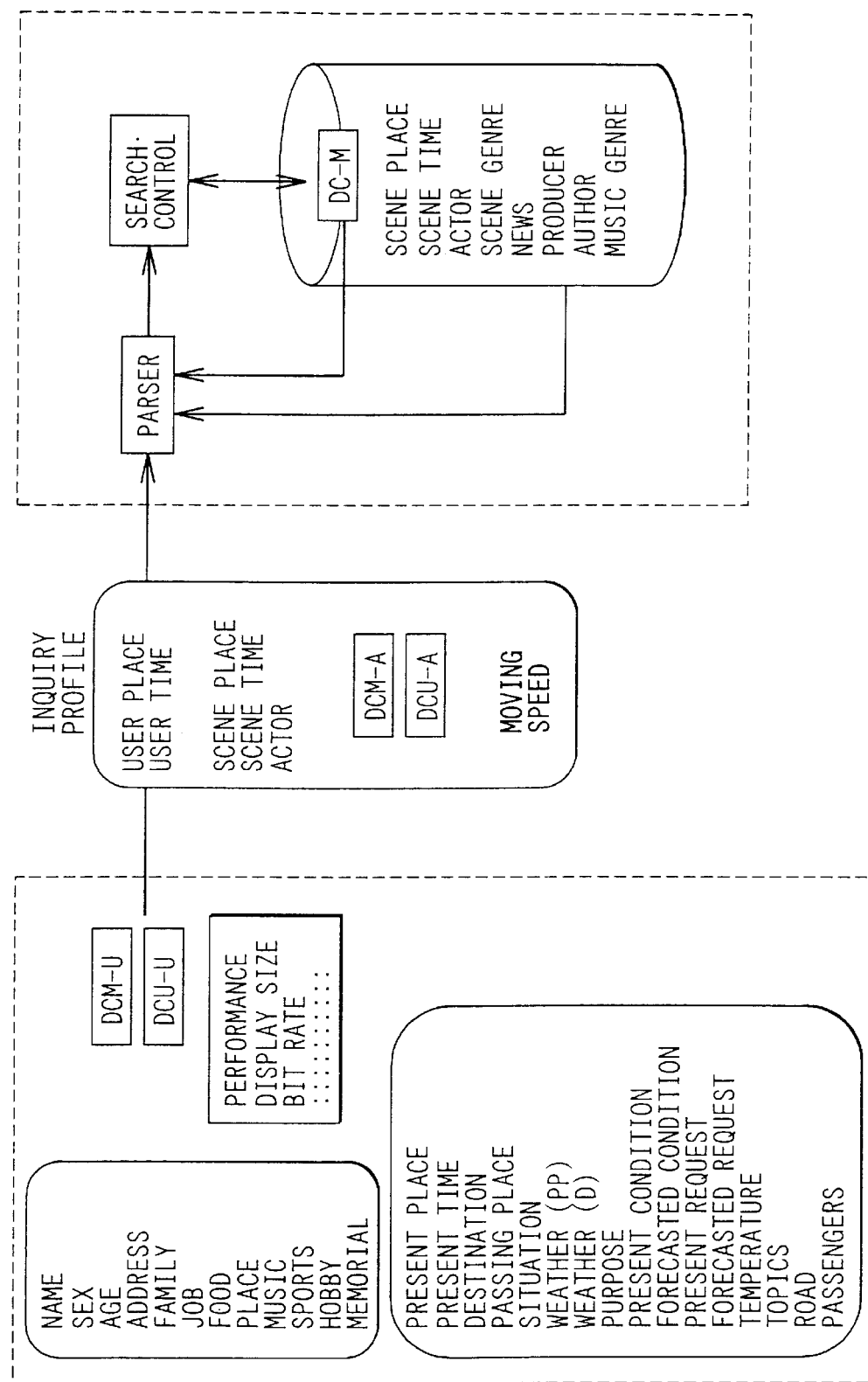
FIG. 25 is an explanatory diagram illustrating the dependence factor in a vehicle information device.

As illustrated in FIG. 25, as the dependency factors in DC-U, the personal information of user such as "Name", "Sex", "Age", "Address", "Family", "Job", "Favorite Food", "Favorite Place, "Favorite music", "Favorite Sports", "Hobby" and "Memorial Days" of a user or the like, situation information such as "Present Place", "Present Time", "Destination", "Passing Place", "Situation", "Weather at the Present Place", "Weather at the Destination", "Purpose", "Present Condition (such as Feeling)", "Forecasted Condition", "Present Request", "Forecasted Request", "Temperature (inside the vehicle, outside the vehicle, desired one", "Topics", "Running Road (Express way/ordinary road)" and "Details of Passengers" or the like and system information such as "Terminal Performance", "Display Area Size" and "Bit Rate" or the like can be listed. As the DC-A used in direct for the search, those in relation to the dependency factors such as "Present Place of User", "Present Time of User", "Scene Place", "Scene Time", "Actor" and "Moving Speed" may be thought. As the DC-M, the media factors such as "Scene Place", "Scene Time" may be thought as the dependency factors.

Next, understanding of the dependency factor is deepened here by indicating the examples of the typical dependency factors and the dependency factor values which the dependency factors can take.

(15) Examples of the Dependency Factors and Dependency Factor Values (15-1) User Factors Tu: User time (Example: 14:25, Wed. Nov. 29, 2000)

Xu: User place (Example: Komenogi-cho, Nisshin-shi, Aichi Pre.; Nagoya St., near the station OO, others)

Fu: User feeling (Example: Refreshing; being tired; hot; irritated; others)

Wu: Weather condition of the user place (Example: Snow; Light rain; Fog; Fine; Thunderstorm; others)

(15-2) Media Factors

Ts: Scene time (Example: PM 2:00, July 7; Spring; Five years before; tomorrow; others)

Xs: Place indicated by the scene (Example: Yokohama; Paris; near Showa Town, Kariya City; others)

As: Actors appearing in the scene (Example: idol Singer XXX; a ground mother; the Minister; Others)

Fs: Feeling of the scene (Example: beautiful; intensive, cold, warm, complicated, others)

Ws: Weather condition of the scene (Example: Fine; typhoon; Flood; Lightning; Cloudy; Heavy rain; others)

(16) Description Example of Dependency Codes

In the item (15), examples of the dependency factor values which the dependency factor can take are summarized. Therefore, next, the description example of the dependency codes indicating existence or non-existence of dependency to such dependency factors will be indicated. Here, various description examples will be indicated under the condition that the dependency factor of content is assumed as the scene time (Ts), Scene place (Xs), actor (As) and feeling (Fs) explained above. The value "0" indicates non-dependence, value "1" indicates dependence and "X" indicates non-determination.

Scene 1: Hotel at Karuizawa (1, 1, 0, X)

In general, it can be thought that the dependency code (1, 1, 0, X) may be given to the "Hotel Video of Sightseeing Spot".

Scene 2: Machinery Repair Manual Video (0, 0, 0, 0)

In general, it can be thought that the dependency code(0, 0, 0, 0) may be given to the "Video Manuals". As the resembling example, there is the "Corresponding Manual Video When Emergency Disaster Is Generated in the Aircraft".

Scene 3: Situation of Entoh Green Road (1, 1, 0, 0)

① Requesting degree as traffic congestion (1, 1, 0, 0)

② Requesting degree as route guide video (0, 1, 0, 0)

Scene 4: Route Guide Video up to the Aichi Healthy Wood (0, 1, 0, 0)

Scene 5: Video of Manami OOOO in Okinawa, August (1, 1, 1, X)

When Manami OOOO is an idol, the main dependency factor is As=1 under the precondition that the requesting degree of idol video rises. Therefore, following cases may be thought depending on the manner with which the information is given. When the requesting degree depends only on the actor of scene, the code is (0, 0, 1, X), when the requesting degree depends on the scene place and actor, the code is (0, 1, 1, X) and when the requesting degree depends on the scene time and actor, the code is (1, 0, 1, X).

Scene 6: Commercial Video of Toys (0, 0, 1, 1)

It is thought here that the requesting degree depends on the actor and feeling.

Scene 7: Sightseeing Guide of Skiing Area (1, 1, 0, X)

The dependency code resembles the "Hotel Guide of Sightseeing Spot".

Scene 8: News video (X, X, X, 0)

In this case, it can be understood that above four dependency factors are not so effective for the primary search explained above. Therefore, when the news videos are included in the contents, it can be thought that it is necessary to set the other dependency factors, for example, the news attribute or the like.

Under the precondition that the dependency code is described for such dependency factor, for example, if the dependency code (DC-A) explained above is (0, 1, 0, X), the scene {1, 3, 4, 5, 7} is hit with the primary search process. Moreover, if the dependency code (DC-A) is (0, 0, 1, X), the scene {5, 6} is hit.

The effect of the search system as the second embodiment structured as explained above will then be explained. In order to assure easier understanding of the explanation, the problems of the related art will be explained first briefly.

As is distinctive in the Internet, a tremendous number of contents are distributed over a plurality of database sites and the effective search methods for these contents are expected. Particularly, at the mobile terminals, it is desired that the contents corresponding to the user requests is immediately searched and distributed. However, at present, it is impossible to obtain the system which can offer the information on the realtime basis at the low cost calculation by searching the database at the sites other than that specified previously.

When it is attempted to execute the search of content, for example, the video data or the like with the existing search system, the meta-data (content description data) generated with the draft of the International standard ISO/MPEG7 in relation to the media description format which is now being standardized may be used, but the data size of the meta-data exceeds, in some cases, 1K bytes. Therefore, if the search object in the terminal side increases in the order higher than several millions, the meta-data communication in the G-byte order is required. Moreover, if the users themselves exceed several millions peoples, situation in which the realtime process becomes impossible even when the latest computer is used will be generated from the viewpoint of the communication infra-structure and communication traffics in the database site.

Meanwhile, the present second embodiment proposes the search process of applications with the dependence information by totally defining the search object information including not only the programs but also contents such as video data.

In practice, the evaluation function is defined with the inner product calculation of the dependency code to execute the primary search using the dependency code (DC) expressing the element of the dependence vector defined in the first embodiment with the level "0" or "1". That is, the quick search of the contents belonging to every genre can be realized with the simplified calculation based on the technical idea to grasp the applications such as video data which cannot be easily described with the typical values in the format of the dependency code (DC).

According to the primary search using the dependency code (DC), it can make contribution to the high-speed search. Moreover, it can improve mutual running property of contents. That is, the contents which have been sorted to different genres can easily be searched. For example, for the user request to acquire the Karaoke video, the advertisement/commercial video, for example, is acquired in matching with the search conditions. Moreover, even if the characteristic of content is not clearly described, the search object can be focused. Moreover, such primary search is also effective when it is difficult to automatically replace the characteristic of content with a unique typical value, because it is difficult to automatically describe the time and place with the typical values, for example, in the case where a certain video data is formed of the scenes extending over various time zones and places.

Moreover, the general description of the applications may be attained by grasping the applications with the dependence information for the dependency factor. It will be explained next.

(18) General Description of Applications
(18-1) Acquisition of Dependency Code

For example, when there exists a camera which can add the content description to the video obtained, it is desirable that the code (Ts, Xs, As, Fs) explained above can be added automatically to the video and audio signals. TS, Xs can be acquired automatically. Meanwhile, As, Fs can be inputted via the manual input operation. Therefore, it is thought to prepare for the question dialog scenario for hearing the information about natural generation of meta-data from a user. For example, the "Sightseeing, congestion, route guide" is inputted with the audio input, keying input, annotation and menu selection or the like at the time of generating contents and subsequent input may be executed depending on the successive guidance programs. Thereby, a user is only requested to send a response to the question from the agent and a user can semi-automatically give the description without any worry.

(18-2) Update of Dependence Information
① Update of Dependence Information Given to Media Here, it is assumed that a woman "Hanako OOOO" among a group of women picked up in the video content Cx (Mar. 2, 1997, Yokohama China Town) is found as a most popular idol singer "Manami OOOO".

In this case, it is thought that the requesting degree to the video content Cx changes depending on the factor of actor (As). In such a case, the element regarding the actor (As) in the dependency code is updated to "1" from "0".

② Update of Dependence Information Generated by the Agent Depending on the User Request Here, it is thought that the load vector W of the formula (3) or (6) is corrected depending on the search record of user and that of the other users.

(18-3) General Expression of Application

Applications change with times and are also different depending on countries and cultures. Meanwhile, the databases which can be used with each other may be used continuously. Therefore, it is difficult for the contents other than that generated assuming the particular services to sort the contents based on the application name.

However, for example, when an idol of the entertainment world, traffic congestion information, news and sightseeing information are considered, the point of view of users for the application for processing such information and content may change but it is thought the constant and general basic evaluation attribute exist. Therefore, the general description of application is thought to be possible by expressing the dependence information with the general dependency factor and setting up the correspondence between the dependency factor and application in the dependency table.

(18-4) Encoding from Application in the User Side

Aggregation of the applications 180 which may be selected with the user terminal 100 is expressed as $$Ac=\{Ac1, Ac2, \ldots, can\}$$

When a user selects a certain application Aci from above aggregation, it is possible to set up the correspondence between Aci and content C1 when the identification information corresponding to the application exists in the content database 282 of the server apparatus 200. However, the identification information to uniformly express the applications in the world for a long period of time does not actually exist. Therefore, the application is expressed with the dependence information such as the dependency code using the dependency table 150a for converting the application Aci into the standard media attribute and user attribute.

(18-5) Encoding from Application at the Server Side

Similarly, a creator of content to be stored in the database assumes aggregation of applications selected with a terminal user assumes as Am={Am1, Am2, . . . , AmM}

The application Amj is selected from the above aggregation and Amj is expressed with the dependency code suitable for content to be registered using the dependency table 250a of the server apparatus 200. Thereby, if Ac and Am belong to different aggregation of applications, mutual operation ability of contents is assured through the general expression with the dependency code and stable search operation can be executed even for any inquiry.

Figure 14:
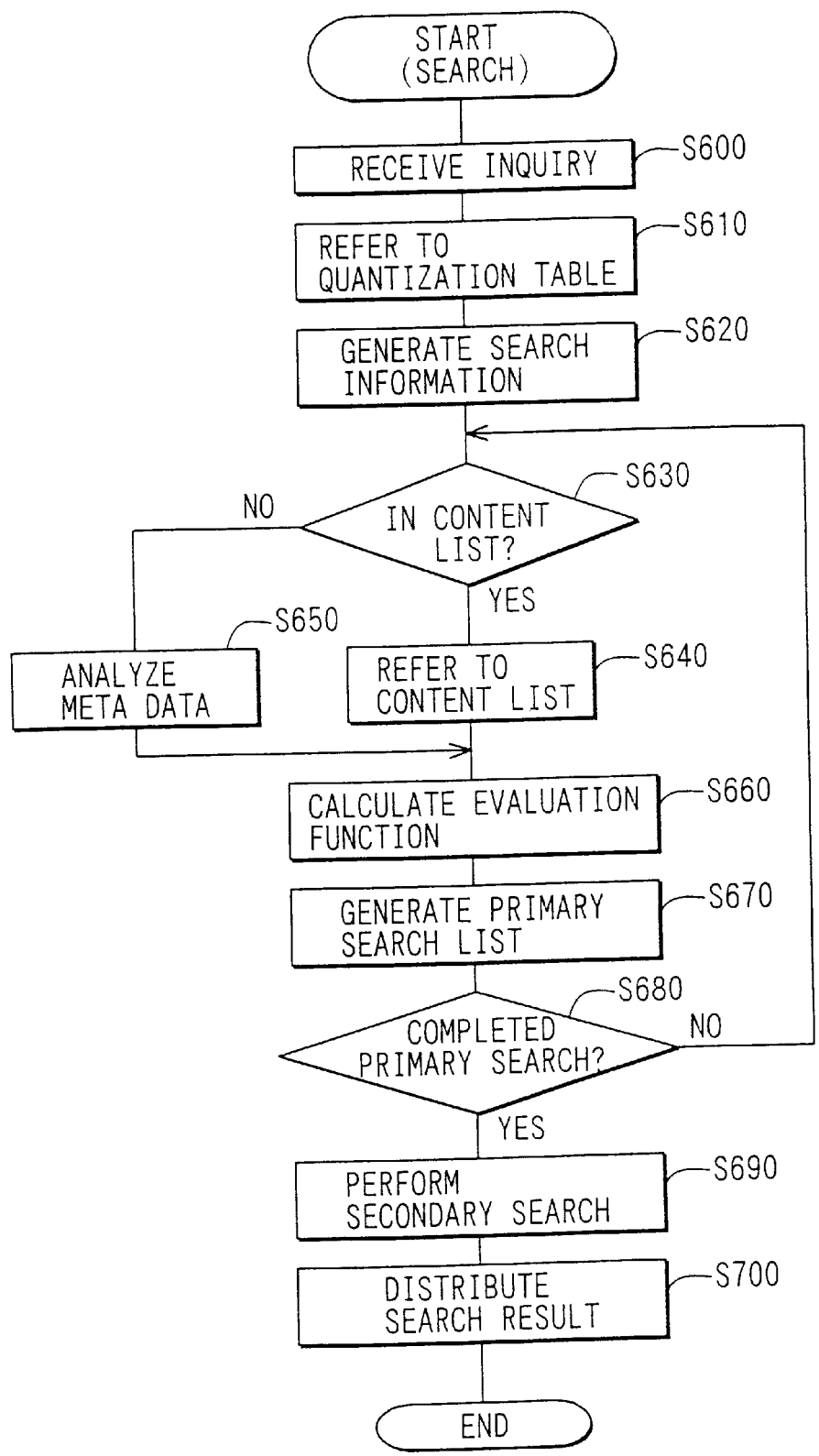
FIG. 14 is a flow diagram indicating the search process.
Figure 26:
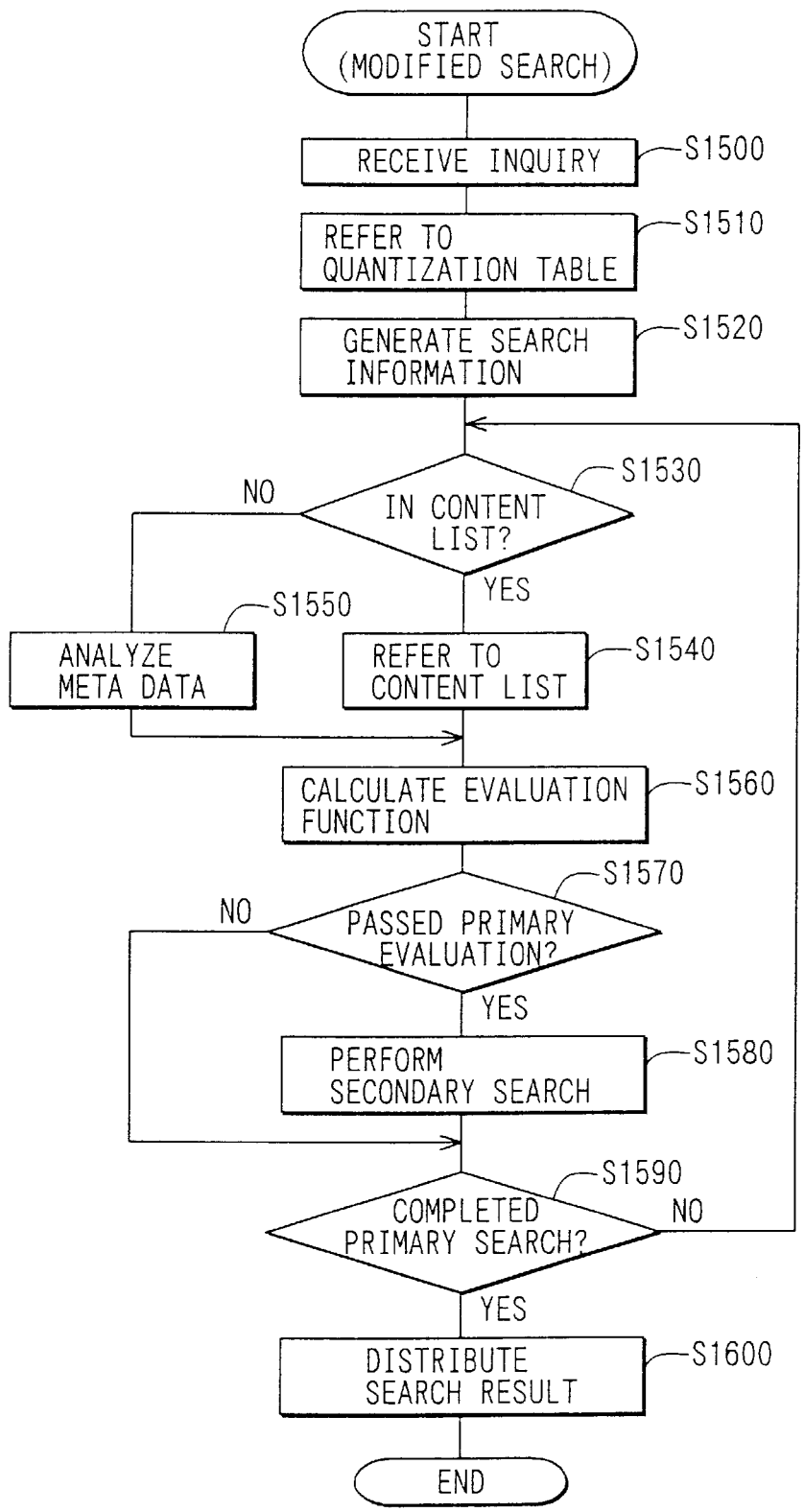
FIG. 26 is a flow diagram indicating a modification example of the search process.

Moreover, a modification example of the search process illustrated in FIG. 14 is illustrated in FIG. 16. In the search process of FIG. 14, the primary search list is generated (S670) after the evaluation function calculation (S660), when the primary search is determined to be completed (S680: YES), the secondary search is conducted using the meta-data (S690). On the other hand, as illustrated in FIG. 26, it is also possible that after the evaluation function calculation (S1560), it is determined whether such calculation has passed the primary evaluation or not (S1570), when the calculation has passed the primary evaluation, the secondary search with the meta-data may be conducted immediately (S1570: YES, S1580).

Figure 27:
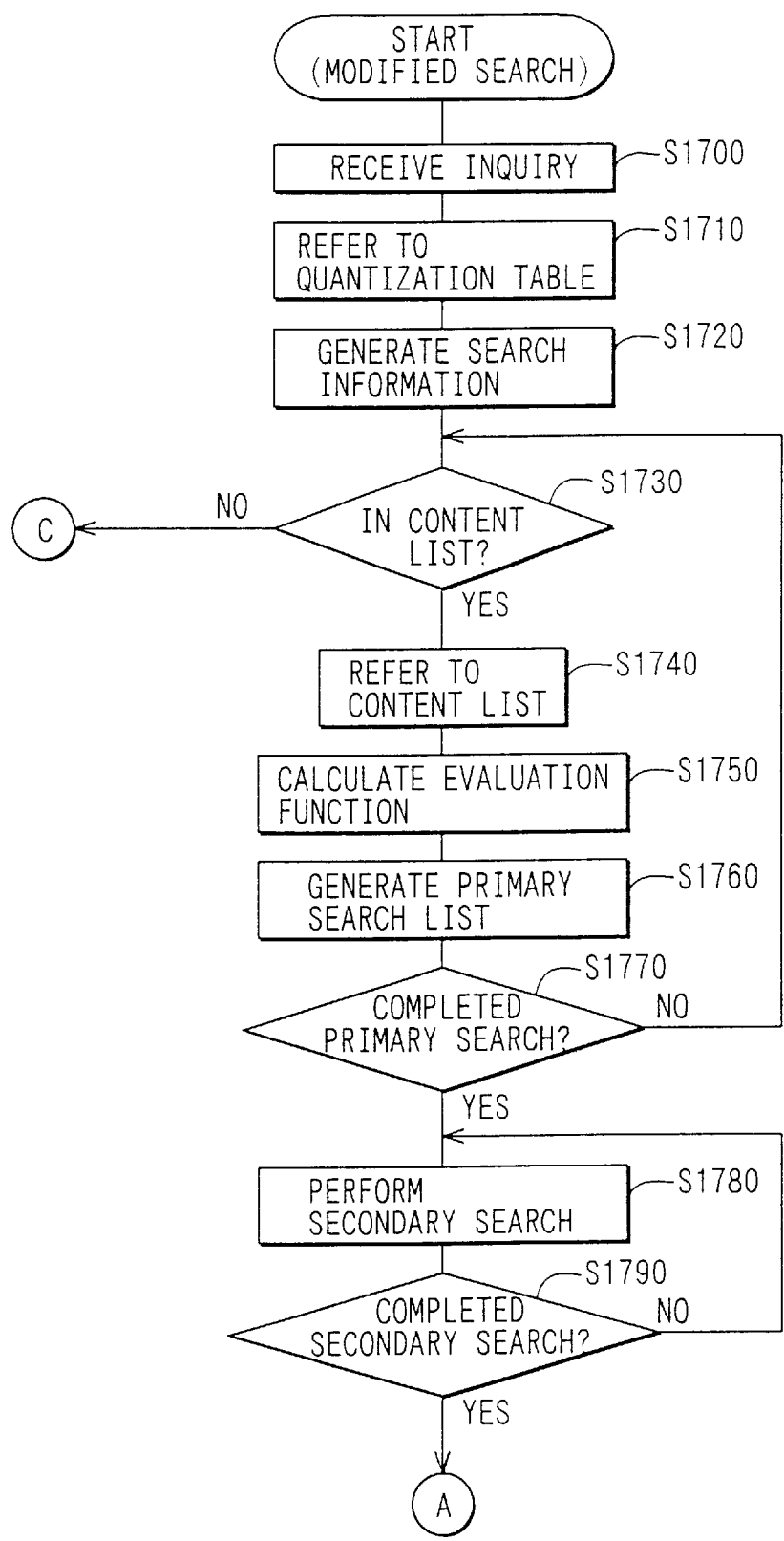
FIG. 27 is a flow diagram indicating the former half of another modification example of the search process.
Figure 28:
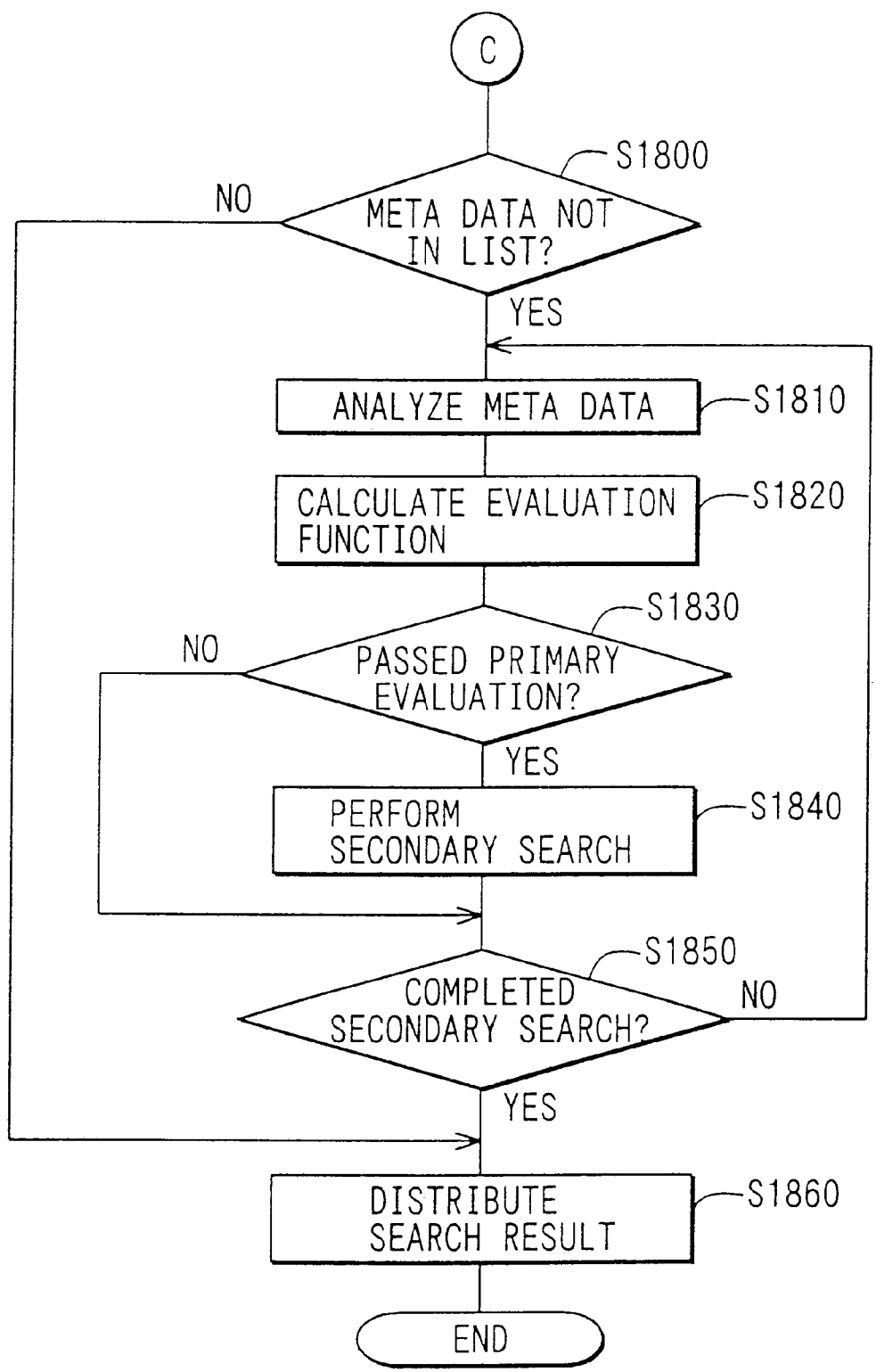
FIG. 28 is a flow diagram indicating the latter half of the other modification example of the search process.

Another modification is also illustrated in FIG. 27 and FIG. 28. In this case, the former half of the search process of FIG. 27 is almost similar to the process of FIG. 14. After the secondary search is completed (S1790: YES), the process advances to the S1800 of FIG. 28. If the meta-data which cannot be found in the content list 281 exists (S1800: YES), the evaluation function calculation with the meta-data analysis is conducted (S1820). When the calculation has passed the primary evaluation (S1830: YES), the secondary search is also conducted (S1840).

As explained above, the search process can be realized in various variations with a structure of the content list 281 or the like.

The present invention is not limited to such embodiments and allows various changes and modifications within the scope not departing from the subject matter of the present invention.

[Others]

(a) Regarding the Dependency Factor

It has already explained that the user factor, system factor and media factor can be thought as the dependency factors. It is also explained above that the dependency factor value for such dependency factor is determined based on the data acquired with the situation extracting unit 30, 130, 230. Moreover, the acquisition policy or the like for the dependency in regard to the time dependency, space dependency and scene dependency which are set as the dependency factor will be additionally explained below.

(a-1) Time Dependency

An attribute value of a certain attribute or the time for selection of application are recorded on the time axis and tendency obtained in the period of each level of day, week, month and year is analyzed. Particularly, if the constant spectrum cannot be obtained in each period, dependency cannot be determined. Those having the spectrum larger than the constant value is determined to have the dependency on the time period.

(a-2) Space Dependency

An attribute value of a certain attribute and space in which the application is selected are recorded on the space list. Here, the space list corresponds to a category list of the places such as space in front of station, internal space of aircraft, restaurant, internal space of vehicle, part, office, . . . , a positional information list obtained from GPS information or a place name list. The space dependency not dependent on a particular individual can easily be generated by collecting the profiles of many users and measuring information of the dependency factor. Thereby, it is possible to forecast the applications to be driven in relation to the place.

Moreover, whether the requesting degree to a certain application program is high or not can be forecasted before the sufficient measuring data is collected using the space dependency collected based on the space list of each category even if the unknown spaces which are physically different are spaces of the category for which the dependence characteristic is already acquired.

(a-3) Scene Dependency

Scene dependency is defined as combination of various situation information pieces including time and space explained above. Since the dependency factor explained above includes the situation information, the scene can be expressed as the multi-dimensional combination of the dependency factors. However, when considering from the point of view of system control for users, the number of significant scenes can be thought as distinctively smaller than random combination of a plurality of dependency factors. Therefore, it is effective for the scene of the fixed format to be defined as the independent dependency factor.

Moreover, dependency on such scene can be used more easily when it is obtained previously with a user or a system developer in place of the learning from the total blanking condition. Therefore, required here is a function to semi-automatically execute the adding of new scenes and correction of scenes for definition of the present scene. This function may be attained by previously recording the dependence vector corresponding to the application that is finally executed on the dependency table 50$a$ and then registering, through the encoding, the scenes having a larger number of vectors included in the cluster (scenes having higher frequency of generation) after the clustering thereof.

(b) Application Example

The control information output apparatus 1 of the first embodiment has been explained with inclusion of the case where the home electric appliances are defined as the object apparatus 70. However, the second embodiment indicates a structure as the search system and also indicates that a user terminal 100 may be structured as a navigation apparatus or a mobile information terminal.

Moreover, application examples of control operation using the control information (dependence information) will be explained below with inclusion of case where the control information output apparatus 1 (user terminal 100) as an embodiment is mounted into, for example, a vehicle.

(b-1) User Customization

① Menu of scenery spots is displayed depending on the taste of a user.

② Internet home page is searched depending on the taste of a user.

③ Information search is executed depending on the area where a user lives.

④ Key layout and menu format are offered depending on the situation on the display.

(b-2) Control of Display Mode

① Pop-up menu is changed depending on time zone.

② Communication data format is changed depending the communication partner.

③ Video format is adequately changed depending on the running condition and ambient environment.

(b-3) Control of Audio Output

① Volume is automatically reduced when a vehicle is running nearer to the intersection or a vehicle is running in the lower speed.

② Structure not to generate any sound depending on the situation is offered. For example, a call termination sound is never generated considering the situation that a user stays in the concert hall. The requesting degree to the application program to generate the sound highly depends on the place.

(b-4) Change of Modal

① If audio response is inadequate, the response is displayed with videos or characters.

② If video and character are inadequate, transmission is realized with voices.

③ If transmission with only voices is insufficient, video and characters may be displayed simultaneously.

④ If transmission with only video and character is insufficient, voice is also used.

(b-5) Adaptation of Communication Environment

For example, in the S1100 to S1160 of FIG. 20 explained in regard to the second embodiment, existence of summarized operation and encoding system are determined depending on the content searched to realize the distribution process. In order to attain highly efficient data search, not only the search process but also communication must be considered simultaneously. That is, adaptation of the communication environment is necessary.

① Adaptability of Communication System

The optimum communication environment for a certain content C1 depends on the dependency factor Xk. Therefore, adaptability of communication system in a certain phase (moving velocity of terminal, place and channel bit rate) can be evaluated. In practice, evaluation can be executed for a plurality of systems to select the optimum system and moreover evaluation can also be executed for a discrete system to estimate the optimum parameter.

② Selection of Communication System

In the situation where communication is interfered with a tunnel, the communication search is switched to the local media search or communication between vehicles. Here, the requesting degree of this communication control may be determined as having higher dependency on the place, moving velocity and weather condition or the like. That is, in the place where the communication signal is often intermitted due to the influence of tunnel and sloping areas because of existence of many mountains, importance of this communication control application increases. Moreover, the base stations which can realize high-speed download are assigned to the mobile terminals depending on the place. Moreover, when a plurality of channels may be sued, the lowest price channel is selected based on the cost table.

③ Summary of Adaptive Communication System

Figure 29:
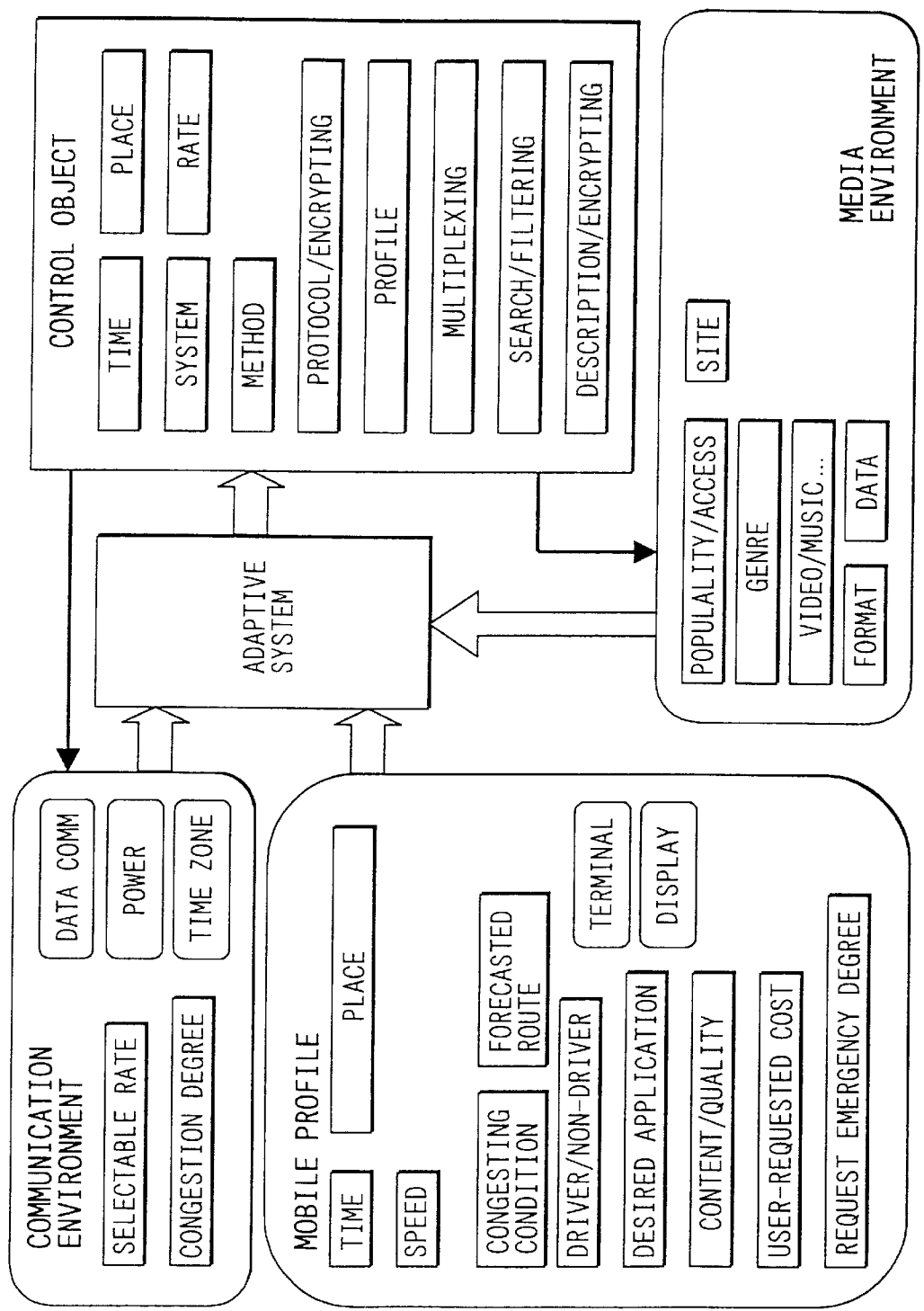
FIG. 29 is an explanatory diagram illustrating the outline of an adaptive communication system as the application example.

FIG. 29 illustrates an adaptive communication system for totally determining three environments such as user environment/terminal environment, media environment and communication environment in view of controlling the control objects.

The user environment/terminal environment includes time, place, moving velocity, ambient congesting condition, forecasted route, discrimination for driver/non-driver, desired application, content/quality of requested content, cost requested from a user and emergency degree of request or the like. Moreover, the media environment includes popularity/access centralization degree, kind of site, genre, discrimination for video/music/character/data, description format and amount of data. Moreover, the communication environment includes selectable communication route and congestion degree of traffic. On the basis of such various environments, the adaptive communication system controls transmission period, transmission place, communication system, communication rate, communication method, communication protocol/encrypting means, communication profile system, multiplexing method and search/filtering/processing system/description system/encoding system.

It is not easy to totally grasp such various environments with the existing technology. However, above three environments can be totally grasped and adequate communication control can be realized with introduction of the concept of dependency. It means that the environments and various factors expressed can be generally described with the dependency. Moreover, these environments can be embodied with the concept of applications explained in the embodiments.

What is claimed is:

1. A control information output apparatus, comprising:
   a memory means for storing dependence information indicating whether application programs to be executed in an object apparatus respectively depend on predetermined dependency factors; and
   a control information output means for outputting control information based on the dependence information stored in the memory means.

2. A control information output apparatus as in claim 1, wherein the dependency factors includes at least one of a user factor as a factor in relation to users, a system factor as a factor in relation to a system controlled with the control information and a media factor as a factor in relation to media as process objects of the application programs.

3. A control information output apparatus as in claim 1, wherein the dependence information is stored in the memory means as a two-dimensional table setting up correspondence between the application program and the dependency factor.

4. A control information output apparatus as in claim 1, wherein the dependence information enables expression of the dependence degree indicating a degree of dependence.

5. A control information output apparatus as in claim 1, wherein it is defined that the application program depends on the dependence factor when a requesting degree indicating a statistic degree of request of user to the application program relatively changes to a large extent for a dependence factor value under a precondition that the dependency factor takes a continuous or discrete dependence factor value.

6. A control information output apparatus as in claim 5, wherein, the requesting degree relatively changes to a large extent for the dependency factor value, a maximum varying width of the requesting degree exceeds a first threshold value, the maximum value of the requesting degree exceeds a second threshold value and the dependence characteristic indicating the correspondence relationship between the dependency factor value and the requesting degree is constant or has regularity to passage of time, for the dependency factor value which the dependency factor can take.

7. A control information output apparatus as in claim 1, wherein the control information output means outputs the dependence information as the control information.

8. A control information output apparatus as in claim 1, wherein the control information output means outputs, as the control information, a dependence characteristic indicating a correspondence relationship between the dependency factor value and a requesting degree indicating a statistic degree of request of a user to the application programs.

9. A control information output apparatus as in claim 1, wherein the control information output means outputs, as the control information, a dependency factor list indicating the dependency factors which are assumed to be relatively effective among the dependency factors.

10. A control information output apparatus as in claim 9, wherein the dependency factor list is formed in a hierarchical structure of a plurality of levels depending on the degree of effectiveness of the dependency factors.

11. A control information output apparatus as in claim 1, further comprising:
    a dependency factor value acquiring means for acquiring a dependency factor value.

12. A control information output apparatus as in claim 11, wherein the control information output means outputs, as the control information, the dependency factor value acquired by the dependency factor value acquiring means.

13. A control information output apparatus as in claim 12, wherein the control information output means outputs, as the control information, the dependency factor value corresponding to the dependency factor assumed to be relatively effective among the dependency factor values acquired with the dependency factor value acquiring means.

14. A control information output apparatus as in claim 11, wherein the control information output means determines the application program having relatively higher execution request based on the dependency factor value acquired by the dependency factor value acquiring means and the dependence characteristic and outputs, as the control information, the application list indicating the application program.

15. A control information output apparatus as in claim 11, wherein the control information generating and outputting means searches, when it is instructed to select the application program via input means, the dependency factor depending on the application program based on the dependence information, determines the application program having relatively higher execution request based on the dependency factor value acquired by the dependency factor value acquiring means corresponding to a searched dependency factor and the dependence characteristic and outputs, as the control information, the application list indicating the application program.

16. A control information output apparatus as in claim 14, wherein the control information output means obtains the requesting degree for the dependency factor using the dependency factor value and the dependence characteristic to determine the application program having the relatively higher execution request based on the requesting degree.

17. A control information output apparatus as in claim 16, wherein the control information output means obtains an execution confidence degree for the dependency factor of the application program based on the requesting degree for the dependence factor, and determines the application program having relatively higher execution request based on the execution confidence degree.

18. A control information output apparatus as in claim 17, wherein the memory means stores a subordination relationship among the application programs; and
wherein the control information output means compensates for the execution confidence degree with reference to the subordination relationship stored in the memory means and determines the application program having relatively higher execution request based on the compensated execution confidence degree.

19. A control information output apparatus as in claim 14, wherein the control information output means estimates unknown dependency factor value based on a requesting degree for the application program having relatively higher execution request.

20. A control information output apparatus as in claim 14, wherein the application list has a hierarchical structure of of a plurality of levels depending on the execution requesting degree.

21. A control information output apparatus as in claim 15, wherein the control information output means statistically learns and changes the dependence characteristic based on an instruction for selection of the application program inputted from a user via an input means.

22. A control information output apparatus as in claim 21, wherein the control information output means learns and changes the dependence information depending on learning and change of the dependence characteristic.

23. A control information output apparatus as in claim 1, wherein the control information output means outputs the control information to an external apparatus via a communication means.

24. A control information output apparatus as in claim 1, wherein the control information output means outputs the control information to a memory medium which is mounted detachably.

25. A control information output apparatus as in claim 1, wherein the control information output means outputs the control information through an encoding process.

26. An information system comprising:
a control information output apparatus including a memory means for storing dependence information indicating whether application programs to be executed in an object apparatus respectively depend on predetermined dependency factors, and a control information output means for outputting control information based on the dependence in formation stored in the memory means; and
an information processing apparatus for executing a process based on the control information outputted from the control information output means.

27. An information system as in claim 26, wherein the information processing apparatus is provided with a decoding means for decoding the control information under a precondition that the encoded control information is outputted by the control information output means.

28. An information system as in claim 26, wherein the information processing apparatus is a sever apparatus as the object apparatus for searching database by utilizing the control information transmitted via a communication means.

29. An information system as in claim 26, wherein the information processing apparatus is the object apparatus which operates by reading the control information outputted to a memory medium.

30. An information system as in claim 26, wherein the information processing apparatus is a control apparatus for controlling a plurality of the object apparatuses by reading the control information.

31. An information system as in claim 26, wherein the control information output apparatus is a remote control terminal for operating a plurality of object apparatuses; and
the information processing apparatus is an object apparatus which operates by reading the control information transmitted from the remote control terminal.

32. An information system comprising:
a control information output apparatus including a memory means for storing dependence information indicating whether it depends on a predetermined dependency factor, and a control information output means for outputting the control information based on the dependence information stored in the memory means; and
a server apparatus including a search means for searching applications by utilizing the control information outputted from the control information output means.

33. An information system as in claim 32, wherein any one of the control information output apparatus or the server apparatus can quantize a dependency factor value which the dependency factor can take.

34. An information system as in claim 32, wherein the server apparatus includes a sever side memory means for storing application dependence information indicating whether the application depends on the predetermined dependency factor; and
wherein the search means executes searches based on the application dependence information stored in the server side memory means.

35. An information system as in claim 34, wherein the control information includes, as a user request, a dependence vector indicating dependence or non-dependence on the dependency factor;
wherein the application dependence information includes a characteristic vector indicating that the application depends on the dependency factor in relation to the search; and the search means executes the searches by an inner product calculation of the dependence vector and the characteristic vector.

36. An information system as in claim 35, wherein the characteristic vector is generated from detail data of the applications.

37. An information system as in claim 36, wherein the characteristic vector generated from detail data of the applications is additionally stored in the server side memory means for recycle use.

38. An information system as in claim 35, wherein the dependence vector and the characteristic vector express a dependence degree indicating a degree of dependence.

39. An information system as in claim 35, wherein the elements of the dependence vector and the characteristic vector express the dependence on the dependency factor value which the dependency factor can take.

40. An information system as in claim 35, wherein elements of the dependence vector and the characteristic vector are realized as the dependence code expressed with two levels of "0" or "1".

41. An information system as in claim 35, wherein the inner product calculation executes a calculation of the elements for predetermined factors among the dependency factors in relation to the search.

42. An information system as in claim 35, wherein the inner product calculation executes a calculation of elements for dependency factor in relation to the search by giving a priority sequence, and cancels the calculation in the course of processing if a reference predetermined for each element is not satisfied.

43. An information system as in claim 35, wherein the search means subsequently executes a secondary search based on the detail data of the applications after a primary search based on the inner product calculation.

44. An information system comprising:

a control information output apparatus for expressing a user side application with user side dependence information indicating dependence or non-dependence on a dependency factor predetermined in a user side and outputting a control information based on the user side dependence information; and a server apparatus for expressing a server side application with a server side dependence information indicating dependence or non-dependence on a dependency factor predetermined in the server side, and operating, based on the control information, through correspondence between the user side application and the server side application.

45. An information system as in claim 44, wherein vector elements of the user side dependence information and the server side dependence information are realized as dependency code expressed with two levels of "0" or "1".

46. An information system as in claim 44, wherein the server side dependence information is generated based on a correspondence relationship table of a language expression for identifying the application and server side dependence information using the information which is inputted when the application is added.

* * * * *